() United States Patent  
Oyama et al.

(10) Patent No.: US 10,538,157 B2  
(45) Date of Patent: Jan. 21, 2020

(54) WORK VEHICLE

(71) Applicant: Kubota Corporation, Osaka-shi (JP)

(72) Inventors: Yoshinori Oyama, Sakai (JP); Takeshi Satozono, Sakai (JP); Rei Tokuda, Sakai (JP); Kazuyuki Tashiro, Sakai (JP); Masatoshi Sakai, Sakai (JP); Yuki Nakaoka, Sakai (JP)

(73) Assignee: Kubota Corporation, Osaka (JP)

( * ) Notice: Subject to any disclaimer, the term of this patent is extended or adjusted under 35 U.S.C. 154(b) by 5 days.

(21) Appl. No.: 15/845,580

(22) Filed: Dec. 18, 2017

(65) Prior Publication Data

US 2018/0105032 A1 Apr. 19, 2018

Related U.S. Application Data

(62) Division of application No. 15/368,931, filed on Dec. 5, 2016, now Pat. No. 10,232,699.

(30) Foreign Application Priority Data

Dec. 21, 2015 (JP) .................................. 2015-248528  
Dec. 24, 2015 (JP) .................................. 2015-252589  
(Continued)

(51) Int. Cl.  
*B60K 1/04* (2019.01)  
*B60K 6/28* (2007.10)  
(Continued)

(52) U.S. Cl.  
CPC .................. *B60K 6/52* (2013.01); *B60K 6/24* (2013.01); *B60K 6/26* (2013.01); *B60K 6/28* (2013.01);  
(Continued)

(58) Field of Classification Search  
CPC ............. B60K 1/04; B60K 2001/0416; B60K 2001/0438; B60K 6/28; B60L 11/1864;  
(Continued)

(56) References Cited

U.S. PATENT DOCUMENTS 5,915,344 A * 6/1999 Suzuki ...................... F01P 7/08  
123/41.11  
6,209,627 B1 * 4/2001 Hasumi ..................... F01P 5/06  
123/41.49

(Continued)

FOREIGN PATENT DOCUMENTS

DE 102006049269 A1 6/2008  
JP 200359541 A 2/2003  
(Continued)

*Primary Examiner* — Bryan A Evans  
(74) *Attorney, Agent, or Firm* — The Webb Law Firm

(57) ABSTRACT

Provided is a work vehicle in which a seat support frame that supports a driver seat is equipped on a vehicle body frame, the vehicle body frame includes: a front portion vehicle frame at which a floor surface of a driving portion is provided; and a rear portion vehicle frame disposed at a position higher than the floor surface of the driving portion and rearward of the front portion vehicle frame. An engine is equipped below the rear portion vehicle frame, a battery that supplies power to an electric motor is equipped above the front portion vehicle frame and below the seat support frame, and a frame portion of the seat support frame that exists above the battery at a position opposing the battery is configured to be detachable from another frame portion that is fixed to the vehicle body frame.

7 Claims, 20 Drawing Sheets

(30) Foreign Application Priority Data

Dec. 24, 2015 (JP) .................................. 2015-252590
Dec. 24, 2015 (JP) .................................. 2015-252591
Dec. 24, 2015 (JP) .................................. 2015-252592

(51) Int. Cl.
| | | |
|---|---|---|
| *B60K 6/52* | (2007.10) | |
| *B60R 21/13* | (2006.01) | |
| *B60P 1/28* | (2006.01) | |
| *B60K 6/24* | (2007.10) | |
| *B60K 6/26* | (2007.10) | |
| *B60K 6/543* | (2007.10) | |
| *B60K 6/48* | (2007.10) | |
| *B60K 17/354* | (2006.01) | |
| *B60K 17/356* | (2006.01) | |
| *B60R 21/00* | (2006.01) | |

(52) U.S. Cl.
CPC ................ *B60K 6/48* (2013.01); *B60K 6/543* (2013.01); *B60K 17/354* (2013.01); *B60K 17/356* (2013.01); *B60P 1/28* (2013.01); *B60R 21/13* (2013.01); *B60R 21/131* (2013.01); *B60R 2021/0018* (2013.01); *B60Y 2200/92* (2013.01); *B60Y 2400/112* (2013.01); *Y10S 903/916* (2013.01)

(58) Field of Classification Search
CPC ............ B60L 11/1877; B60L 11/1879; H01M 10/613; H01M 10/6563; B62D 5/0403
See application file for complete search history.

(56) References Cited

U.S. PATENT DOCUMENTS

| | | | |
|---|---|---|---|
| 7,775,311 B1 | 8/2010 | Hardy et al. | |
| 9,731,599 B2 | 8/2017 | Gagnon | |
| 2007/0158119 A1 | 7/2007 | Pascoe | |
| 2009/0121518 A1* | 5/2009 | Leonard | B60T 7/06 296/183.1 |
| 2009/0301830 A1 | 12/2009 | Kinsman et al. | |
| 2010/0155170 A1* | 6/2010 | Melvin | B60K 11/08 180/339 |
| 2010/0193174 A1 | 8/2010 | Nemoto | |
| 2010/0225264 A1* | 9/2010 | Okuda | B60K 1/04 318/473 |
| 2010/0300791 A1* | 12/2010 | Kern | B60K 5/1216 180/229 |
| 2010/0314182 A1 | 12/2010 | Crain et al. | |
| 2010/0317484 A1* | 12/2010 | Gillingham | B60K 1/04 477/7 |
| 2012/0031688 A1* | 2/2012 | Safranski | B60G 3/14 180/54.1 |
| 2012/0152637 A1 | 6/2012 | Hapka | |
| 2012/0305327 A1 | 12/2012 | Lambri et al. | |
| 2013/0168176 A1 | 7/2013 | Takagi | |
| 2013/0168177 A1 | 7/2013 | Takagi | |
| 2013/0168178 A1 | 7/2013 | Takagi | |
| 2013/0248267 A1 | 9/2013 | Nitawaki | |
| 2013/0298586 A1* | 11/2013 | Hwang | B60K 1/04 62/239 |
| 2013/0333962 A1 | 12/2013 | Lee et al. | |
| 2014/0012449 A1* | 1/2014 | Arita | B60W 20/00 701/22 |
| 2014/0124277 A1* | 5/2014 | Kurakawa | H01M 2/1083 180/65.1 |
| 2014/0124278 A1* | 5/2014 | Takamura | B60L 11/1874 180/65.51 |
| 2014/0144719 A1 | 5/2014 | Morgan et al. | |
| 2014/0262584 A1* | 9/2014 | Lovold | B60K 5/12 180/246 |
| 2014/0345964 A1 | 11/2014 | Nakaoka et al. | |
| 2015/0010782 A1* | 1/2015 | Tanigaki | H01M 10/625 429/7 |
| 2015/0266386 A1 | 9/2015 | Matsuda et al. | |
| 2015/0274013 A1 | 10/2015 | Matsuda et al. | |
| 2015/0280188 A1 | 10/2015 | Nozaki et al. | |
| 2015/0291056 A1 | 10/2015 | Nozaki | |
| 2015/0329148 A1 | 11/2015 | Borowicz et al. | |
| 2015/0357614 A1* | 12/2015 | Sohn | H01M 2/1072 429/100 |
| 2016/0137094 A1* | 5/2016 | Yoda | B60L 11/1874 429/120 |
| 2016/0185202 A1* | 6/2016 | Itoo | B60K 5/00 180/291 |
| 2017/0001549 A1 | 1/2017 | Bessho et al. | |
| 2017/0028881 A1 | 2/2017 | Proulx | |
| 2017/0029036 A1 | 2/2017 | Proulx | |
| 2017/0174069 A1* | 6/2017 | Oyama | B60K 6/52 |
| 2017/0246942 A1 | 8/2017 | Takaki et al. | |
| 2017/0267060 A1* | 9/2017 | Majoros | B62K 11/14 |
| 2017/0320383 A1* | 11/2017 | Ikeuchi | B60K 1/04 |
| 2017/0327058 A1* | 11/2017 | Takezawa | B60K 1/04 |
| 2017/0352929 A1* | 12/2017 | Yasuda | B60K 1/04 |
| 2017/0358786 A1* | 12/2017 | Ikeuchi | B60K 1/04 |

FOREIGN PATENT DOCUMENTS

| | | |
|---|---|---|
| JP | 2004242558 A | 9/2004 |
| JP | 2008062764 A | 3/2008 |
| JP | 3162167 U | 8/2010 |
| JP | 2011046300 A | 3/2011 |
| JP | 2013248918 A | 12/2013 |
| JP | 2014032920 A | 2/2014 |
| JP | 2014133489 A | 7/2014 |

\* cited by examiner

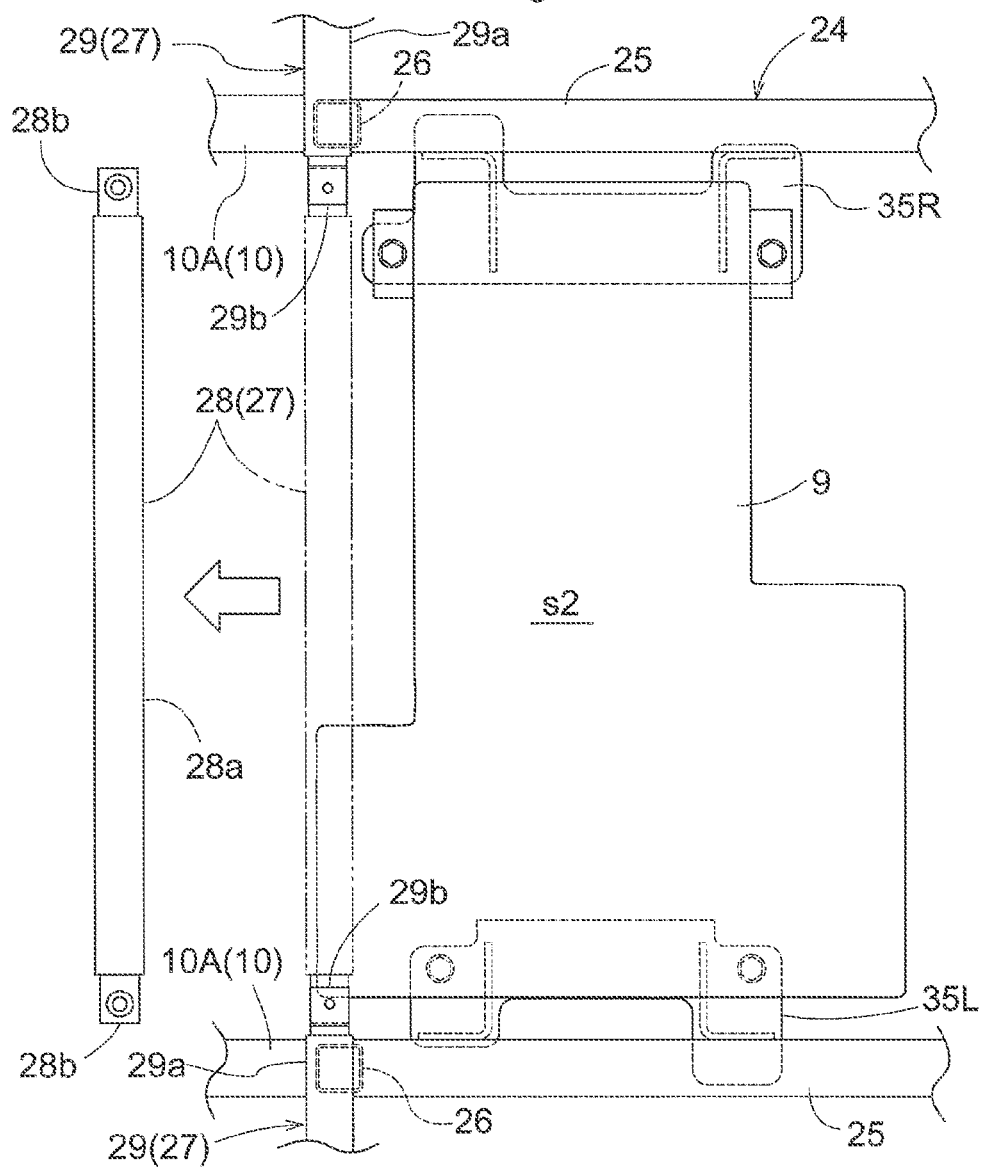
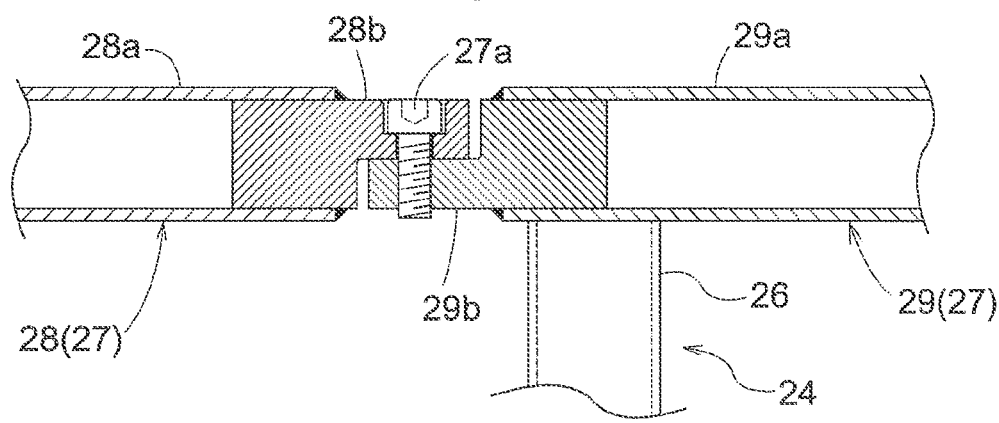

WORK VEHICLE

CROSS-REFERENCE TO RELATED APPLICATIONS

This application is a divisional application of U.S. patent application Ser. No. 15/368,931, filed on Dec. 5, 2016, which claims priority to Japanese Patent Application No. 2015-248528 filed Dec. 21, 2015, and Japanese Patent Application Nos. 2015-252589, 2015-252590, 2015-252591, and 2015-252592, all filed Dec. 24, 2015, the disclosures of which are hereby incorporated in their entireties by reference.

FIELD OF THE INVENTION

The present invention relates to a work vehicle.

BACKGROUND

[1] Regarding work vehicles, the conventional techniques disclosed in JP 2004-242558A (hereinafter referred to as Patent Document 1) and JP 2003-59541A (hereinafter referred to as Patent Document 2) exist.

There are techniques according to which it is possible to select a charging mode in which power of a power generator driven by an engine is accumulated in a battery, or an assist mode in which the power accumulated in the battery is used as power for a work apparatus (e.g., see Patent Document 1).

Some passenger vehicles have a configuration in which a large-sized battery pack is mounted on a body floor portion of the vehicle, separate from an engine included in the hood (e.g., see Patent Document 2), although this configuration is not equivalent to that of a work vehicle.

[2] Conventionally, there have been known to be hybrid work vehicles that use an engine and an electric motor as drive sources, and electric work vehicles that use only an electric motor as a drive source. For example, the work vehicle disclosed in JP 2014-133489A (hereinafter referred to as Patent Document 3) is already known as such a work vehicle. A motor for auxiliary power is included in addition to an engine in the work vehicle disclosed in Patent Document 3. The work vehicle is run by the motor at a time of low speed, and is run by the engine (or by the engine and the motor) at a time of high speed.

SUMMARY OF THE INVENTION

The problem corresponding to Background [1] is as follows.

[1] With the technique disclosed in Patent Document 1, it is indicated that as a battery charging means, a solar battery is provided on the upper surface or the like of a threshing apparatus instead of a power generator, but there is no disclosure regarding where and how to arrange the battery and the engine. Accordingly, no technique is disclosed regarding more stably and logically disposing the battery and the engine when the battery and engine are to be disposed on the traveling device body, or regarding facilitating operations for attaching and removing the battery, which is a heavy load.

The present invention provides a work vehicle in which, when a battery is to be mounted on a work vehicle so as to enable travel by driving by an electric motor as well as an engine, the positions at which the battery and the engine are disposed are devised so as to improve the stability of traveling and make operations for attaching and removing the battery easier to perform.

[2] With the technique disclosed in Patent Document 1, it is indicated that as a battery charging means, a solar battery is provided on the upper surface or the like of a threshing apparatus instead of a power generator, but there is no disclosure regarding where and how to arrange the battery for supplying power to the electric motor and the engine. Accordingly, no technique is disclosed regarding how to make it easier to incorporate a battery, an electric motor, and an engine when the battery, electric motor, and engine are to be arranged on the traveling device body.

The present invention provides a work vehicle in which, when an electric motor and a battery are to be mounted on a work vehicle so as to enable travel by driving by an electric motor as well as an engine, the positions at which the electric motor and the engine are disposed are devised so as to make it easier to incorporate the engine and the electric motor on the traveling device body.

[3] With the technique disclosed in Patent Document 1, it is indicated that as a battery charging means, a solar battery is provided on the upper surface or the like of a threshing apparatus instead of a power generator, but there is no disclosure regarding where and how to dispose the battery and the engine. Accordingly, no technique is disclosed regarding more compactly and logically disposing the battery and the engine when the battery and engine are to be arranged on the traveling device body. Also, there is a risk that the control structure and the like in the case where the electric motor is driven with the power of the power generator driven by the engine, and in the case where the electric motor is driven with the power of the battery will be more complicated.

With the technique disclosed in Patent Document 2, no work apparatus is included, and therefore the battery can be arranged using a wide floor surface. However, with a work vehicle in which various work apparatuses are arranged, the mounting location for the battery is limited, and therefore the battery cannot take up a large area that is a wide range of the vehicle, and in particular, with a configuration in which an engine is mounted on a rear portion side, it is necessary to select a suitable disposition location while giving consideration to the positional relationship between the battery and the engine.

The present invention provides a work vehicle in which, when a battery is to be mounted on a work vehicle so as to enable travel by driving by an electric motor as well as an engine, the positions at which the battery and the engine are arranged are devised so that the battery and the engine can be disposed compactly and logically by effectively using the entire vehicle space.

[4] With the technique disclosed in Patent Document 1, it is indicated that as a battery charging means, a solar battery is provided on the upper surface or the like of a threshing apparatus instead of a power generator, but there is no disclosure regarding where and how to arrange the engine, the electric motor, and the battery. Accordingly, no technique is disclosed regarding more compactly and logically disposing the engine, electric motor, and battery when the engine, electric motor, and battery are to be disposed on the traveling device body.

With the vehicle disclosed in Patent Document 2, no work apparatus is included, and therefore the battery can be arranged at a set position using a wide floor surface. However, with a work vehicle in which various work apparatuses are arranged, the mounting location for the battery is limited, and therefore the battery cannot take up a large area in the wide range of the vehicle, and in particular, with a configuration in which an engine is mounted on a rear portion side, it is necessary to select a suitable disposition location while giving consideration to the positional relationship between the battery and the engine.

The present invention is a work vehicle that can travel by being driven by an electric motor as well as an engine and includes a work apparatus, in which the positions for disposing the engine, electric motor, and battery to be mounted are devised so as to arrange the electric motor and battery at a low position compactly by effectively using the entire vehicle space, and thereby attempt to achieve a low center of gravity of the vehicle body.

The problem corresponding to Background [2] is as follows.

[5] With the work vehicle according to Patent Document 3, there is no disclosure regarding the arrangement location and cooling structure of the battery (referred to as "power supply unit" in Patent Document 3) that supplies power to the electric motor, and thus there is room for consideration regarding making it easier to secure a battery arranging space and efficiently cooling the battery.

In view of the foregoing circumstances, a work vehicle in which it is easy to ensure a battery arranging space, and that is capable of efficiently cooling the battery is desired.

The means corresponding to Problem [1] is as follows.

[1] The present invention is a work vehicle, including:

a vehicle body frame supported by a left and right pair of front wheels and a left and right pair of rear wheels;

a driving portion in which a driver seat is provided; and a motive power portion that transmits drive power to the front wheels and the rear wheels, wherein the motive power portion includes traveling output apparatuses of two systems, namely an engine constituted by an internal combustion engine, and an electric motor for travel driving, a seat support frame for supporting the driver seat on the vehicle body frame is equipped in the driving portion, the vehicle body frame includes a front portion vehicle frame disposed so as to support a floor surface of the driving portion, and a rear portion vehicle frame disposed rearward of the front portion vehicle frame at a position higher than the floor surface of the driving portion, the engine in the motive power portion is equipped below the rear portion vehicle frame, and a battery that supplies power to the electric motor is equipped above the front portion vehicle frame and below the seat support frame, and in the seat support frame, a frame portion existing at a position that is above the battery and opposes the battery is configured to be detachable from another frame portion fixed to the vehicle body frame.

According to the present configuration, the space existing below the rear portion vehicle frame is used effectively so that the engine is arranged in a state in which it is easy to perform cooling by contact with outside air. Also, the battery is equipped above the front portion vehicle frame and below the seat support frame, and can employ a logical structure in which dispersion of electromagnetic waves to outside of the vehicle body is suppressed and exposure of conducting cables and the like to the outside is restricted so that the conducting cables and the like are more easily protected.

Also, in the seat support frame, the frame portion existing at a position that is above the battery and opposes the battery is configured to be detachable from the other frame portion fixed to the vehicle body frame. Accordingly, there is no risk of being hindered by the existence of the seat support frame, and there is an advantage in that tasks of loading and lowering in a state in which the battery, which is a heavy load, has been lifted using a crane or the like, are easier to perform without impairment.

Furthermore, in the present invention, it is preferable that in a range spanning across the entirety of the front portion vehicle frame and the rear portion vehicle frame, the vehicle body frame includes a left and right pair of main frames that are elongated in a front-rear direction, and the battery is provided in a state of being located between the left and right main frames.

According to the present configuration, the battery can be mounted on the traveling vehicle body in a state of being protected by the left and right main frames, which are strong members, and the battery can be disposed between the left and right main frames with a good balance between the left and right sides.

Furthermore, in the present invention, it is preferable that the frame portion of the seat support frame is joined to the other frame portion by a joining bolt that penetrates in a vertical direction, in a state in which an end portion of the frame portion overlaps with the other frame portion from above.

According to this configuration, joining and unjoining of the detachable frame portion and the fixed other frame portion is easy to perform by operating the joining bolt from above.

The means corresponding to Problem [2] is as follows.

[2] The present invention is a work vehicle, including:

a vehicle body frame supported by a left and right pair of front wheels and a left and right pair of rear wheels;

a driving portion in which a driver seat is provided; and a motive power portion that transmits drive power to the front wheels and the rear wheels, wherein the motive power portion includes traveling output apparatuses of two systems, namely an engine constituted by an internal combustion engine, and an electric motor for travel driving, the vehicle body frame is obtained by integrating a front portion vehicle frame disposed so as to support a floor surface of the driving portion, and a rear portion vehicle frame disposed rearward of the front portion vehicle frame at a position higher than the floor surface of the driving portion, the vehicle body frame includes a motive power portion support frame that supports the engine and a transmission, which are located below the rear portion vehicle frame, and supports the electric motor, and the motive power portion support frame is detachably joined to the front portion vehicle frame and the rear portion vehicle frame.

According to the present configuration, the space existing below the rear portion vehicle frame is used effectively so that the engine is arranged in a state in which it is easy to perform cooling by contact with outside air.

Also, because the motive power portion support frame that supports the engine and the transmission and supports the electric motor is detachably joined to the front portion vehicle frame and the rear portion vehicle frame, disassembling and assembling tasks in the periphery of the motive power portion on the traveling vehicle body can be performed easily by detaching the motive power portion support frame.

The present configuration is also advantageous in that assembly and disassembly in the periphery of the engine and in the periphery of the electric motor and maintenance tasks can be performed in a state in which the motive power portion support frame is separated from the traveling vehicle body by being detached from the motive power portion support frame.

Furthermore, in the present invention, it is preferable that in a range spanning across the entirety of the front portion vehicle frame and the rear portion vehicle frame, the vehicle body frame includes a left and right pair of main frames that are elongated in a front-rear direction, and a frontward side of the motive power portion support frame is joined to the main frames at the rear end portion of the front portion vehicle frame and a rearward side of the motive power portion support frame is joined to the main frames at the rear end portion of the rear portion vehicle frame.

According to the present configuration, the left and right main frames, which are strong members, are used effectively to improve the strength of joining the motive power portion support frame to the vehicle body frame, and thus it is easier to improve the support strength of the motive power portion support frame itself.

Furthermore, in the present invention, it is preferable that the motive power portion support frame includes an engine-side frame portion on which the engine and the transmission are mounted and a motor-side frame portion on which the electric motor is mounted, the engine-side frame portion is joined to the main frames, spanning between the rear end portion of the front portion vehicle frame and the rear end portion of the rear portion vehicle frame, and the rear end portion of the motor-side frame portion is joined to the front end portion of the engine-side frame portion, and the front end portion of the motor-side frame portion is detachably joined to the front portion vehicle frame at a location on the forward side with respect to a location at which the rear end portion of the front portion vehicle frame and the front portion of the engine-side frame portion are joined.

According to the present configuration, in the motive power portion support frame, the region in which the engine and the transmission, which are greater in weight and volume compared to the electric motor, are mounted and the region in which the electric motor is mounted are divided such that the engine-side frame portion on which the engine and the transmission are mounted is joined to the main frames spanning across the rear end portion of the front portion vehicle frame and the rear end portion of the rear portion vehicle frame, separately from the motor-side frame portion on which the electric motor is mounted.

Thus, the span of the joining location at the time when the engine-side frame portion is joined to the main frames is made shorter compared to the overall length of the motive power portion support frame, whereby the strength of joining the engine-side frame portion to the main frames is improved.

Also, the motor-side frame portion that supports the electric motor, which is relatively lighter and has a smaller volume compared to the engine and the transmission, is detachably joined to the front end portion of the engine-side frame portion, spanning to the front portion vehicle frame located more toward the front side than the front end portion of the engine-side frame portion. Thus, the motor-side frame portion does not require an excessively strong structure, is formed relatively compactly, and is easy to dispose near the center of the traveling vehicle body.

Furthermore, in the present invention, it is preferable that the motor-side frame portion includes a motor support portion that is located between the left and right pair of main frames and supports a lower edge of the electric motor in a state in which the lower edge of the electric motor is located below an upper edge of the main frames.

According to the present configuration, the lower edge of the electric motor is located below the upper edge of the main frame, which makes it possible to dispose at a position as low as possible on the traveling vehicle body, and therefore the electric motor is easier to dispose in the space near the center of the traveling vehicle body, which tends to be small.

Furthermore, in the present invention, it is preferable that the front end portion of the motive power portion support frame includes a gutter-shaped bracket portion that fits from below on the main frame located at the rear end portion of the front portion vehicle frame, and the motive power portion support frame is configured to be joinable in a state in which the gutter-shaped bracket portion is fit from below the main frame.

According to the present configuration, the gutter-shaped bracket portion is used to make it easier to perform an operation for joining the motive power portion support frame to the rear end portion of the front portion vehicle frame by causing it to fit from below on the main frame.

Furthermore, in the present invention, it is preferable that the motive power portion support frame is joined to the rear end portion of the rear portion vehicle frame via a suspension member, the suspension member includes an abutting surface that can abut from below on a lower surface of the main frame located at the rear end portion of the rear portion vehicle frame and a lower surface of an attachment bracket fixed to a lateral side surface of the main frame, and the suspension member can be fixed by joining to the attachment bracket by a joining bolt that can perform fixing by joining in a vertical direction.

According to the present configuration, it is easier to perform the joining of the suspension member and the main frame with a simple task using the attachment bracket of the main frame and the abutting surface of the suspension member, and using joining bolts capable of fixing by joining in the vertical direction.

The means corresponding to Problem [3] is as follows.

[3] The present invention is a work vehicle, including:
traveling output apparatuses of two systems, namely an engine constituted by an internal combustion engine, and an electric motor for travel driving;
a driving portion in which a driver seat is provided;
a motive power portion equipped with the engine and the electric motor; and
a vehicle body frame for supporting the driving portion and the motive power portion,
wherein the vehicle body frame includes a front portion vehicle frame at which a floor surface of the driving portion is provided, and a rear portion vehicle frame disposed rearward of the front portion vehicle frame at a position higher than the floor surface of the driving portion, and
the engine is equipped below the rear portion vehicle frame, and a battery that supplies power to the electric motor is mounted above the front portion vehicle frame, near a central position in a front-rear direction and a left-right direction of a traveling vehicle body.

With the present configuration, the space existing below the rear portion vehicle frame is used effectively so that the engine is arranged in a state in which it is easy to perform cooling by contact with outside air. Also, the battery is equipped above the front portion vehicle frame, and can employ a logical structure in which dispersion of electromagnetic waves to outside of the vehicle body is suppressed and exposure of conducting cables and the like to the outside is restricted so that the conducting cables and the like are more easily protected.

Also, the battery, which is a heavy load, is mounted near a central position in the front-rear direction and the left-right direction of the traveling vehicle body, and therefore the front-rear and left-right balance of the vehicle body is easily kept favorable, which is also advantageous in that it is easy to perform stable work travel.

Furthermore, in the present invention, it is preferable that the battery is a plug-in type lithium ion battery.

According to the present configuration, a plug-in type battery with a large capacity is constituted by a lithium ion battery, and therefore it is more easily included in a structure that is relatively compact for its capacity.

Furthermore, in the present invention, it is preferable that the battery and the engine are disposed at approximately the same height position.

According to the present configuration, if the battery and the engine, which are a heavy load, are located at approximately the same height, and are thus equipped such that the height positions thereof are at a low portion of the traveling vehicle body, the entire traveling vehicle body can be given a structure according to which stable travel with a low center of gravity is easy to perform.

Furthermore, in the present invention, it is preferable that the driver seat is equipped near a central position in a front-rear direction of the traveling vehicle body, and the battery is equipped in a space below the driver seat.

According to the present configuration, the space below the driver seat can be effectively used to dispose the battery.

Furthermore, in the present invention, it is preferable that the electric motor is equipped at a position that overlaps with the battery in a front-rear direction.

According to the present configuration, the battery and the electric motor are equipped at positions that overlap in the front-rear direction, and therefore compared to the case where the battery and the electric motor are arranged separated in the front-rear direction, it is easier to compactly dispose the battery and the electric motor in a state of being near a location that is near the central position in the front-rear direction of the traveling vehicle body.

Furthermore, in the present invention, it is preferable that the vehicle body frame includes a left and right pair of main frames that are elongated in a front-rear direction, and the engine, the electric motor, and the battery are disposed between a front axis and a rear axis and between the left and right main frames.

According to the present configuration, the engine, the electric motor, and the battery are easily supported by a strong structure in a state of being near the center of the traveling vehicle body in the front-rear and left-right directions.

The means corresponding to Problem [4] is as follows.

[4] The present invention is a work vehicle, including:
traveling output apparatuses of two systems, namely an engine constituted by an internal combustion engine, and an electric motor for travel driving;
a battery for performing power supply to the electric motor;
a driving portion in which a driver seat is provided;
a motive power portion equipped with the engine and the electric motor; and
a vehicle body frame for supporting the driving portion and the motive power portion,
wherein the vehicle body frame includes a front portion vehicle frame at which a floor surface of the driving portion is provided, and a rear portion vehicle frame disposed rearward of the front portion vehicle frame at a position higher than the floor surface of the driving portion, the engine is equipped below the rear portion vehicle frame, and the battery and the electric motor are disposed in a state in which a center of gravity of an aggregate consisting of the battery and the electric motor is located above the front portion vehicle frame and lower than a position of a center of gravity of the overall traveling vehicle body.

With the present configuration, the space existing below the rear portion vehicle frame is used effectively so that the engine is arranged in a state in which it is easy to perform cooling by contact with outside air. Also, the battery and the electric motor are equipped above the front portion vehicle frame, and can employ a logical structure in which dispersion of electromagnetic waves to outside of the vehicle body is suppressed and exposure of conducting cables and the like to the outside is restricted so that the conducting cables and the like are more easily protected.

Also, because the battery and the electric motor are provided in a state in which the center of gravity of the aggregate consisting of the battery, which is a heavy load, and the electric motor is located below the position of the center of gravity of the overall traveling vehicle body, stable work travel in which the center of gravity of the traveling vehicle body is made as low as possible is easy to perform.

Moreover, the present configuration is also advantageous in that because the arrangement configuration of the battery and the electric motor is used as a means for lowering the center of gravity of the entire traveling vehicle body, it is easy to avoid an increase in the number of parts or complication of the structure, resulting from adding a separate balance weight in order to lower the center of gravity or the like.

Furthermore, in the present invention, it is preferable that a driving portion including a driver seat is provided near a central position in the front-rear direction of the traveling vehicle body, the driving portion includes a ROPS frame that surrounds the driving seat and forms a riding space, and the aggregate consisting of the battery and the electric motor is disposed below the riding space.

According to the present configuration, even in a vehicle in which the vehicle body center of gravity tends to become high due to including a riding space formed by a ROPS frame, the position of the center of gravity of the overall traveling vehicle body is easy to make as low as possible by employing an arrangement configuration that lowers the position of the center of gravity of the aggregate consisting of the battery and the electric motor.

Furthermore, in the present invention, it is preferable that the battery and the electric motor are disposed forward of the engine, the battery is formed such that a height of a lower surface of a portion of the battery in a left-right direction is higher than a height of the lower surface of another portion of the battery, and the electric motor is disposed at a location below the lower surface of the portion of the battery that is formed to be higher than the other portion of the battery.

According to the present configuration, by arranging the electric motor so as to be below a location below the lower surface of the battery, which is formed higher than another region, the vertical direction width of the aggregate consisting of the battery and the electric motor is made as small as possible, and it is easy to arrange the entirety of the aggregate at a position that is as low as possible.

Furthermore, in the present invention, it is preferable that a transmission case for performing power transmission to the left and right rear wheels is disposed rearward of the engine, a power transmission shaft extends from the transmission case to the left and right rear wheels, and a front wheel drive shaft for transmitting power to the front wheels extends from the electric motor, which is disposed forward of the engine.

According to the present configuration, transmission of the power of the engine to the rear wheels can be performed from a transmission case disposed rearward of the engine, which is disposed below the rear portion vehicle frame, via a power transmission shaft extending toward a lateral side, at a near position. Also, power transmission from the electric motor to the front wheels can be performed from a location near the front wheels via the electric motor, which is disposed forward of the engine.

In other words, the distance between the rear wheels and the engine, which is the power source of the rear wheels, and the distance between the front wheels and the electric motor, which is the power source of the front wheels, is made shorter, whereby a reduction in the size of the transmission structure and simplification of the transmission structure can be achieved.

The means corresponding to Problem [5] is as follows.

[5] The present invention is a work vehicle, including:

a traveling apparatus;

an electric motor configured to drive the traveling apparatus;

a battery configured to supply power to the electric motor; and a cover member that supports a driver seat mounted thereon and includes a housing space in its interior, wherein the battery is arranged in the housing space, a ventilation opening is provided in the cover member, and a cooling fan for supplying a cooling wind into the housing space is attached at the opening.

According to the present configuration, the battery is arranged by effectively using the housing space inside of the cover member, whereby space for arranging the battery can be ensured easily. Also, by taking travel wind or cooling wind from a cooling fan into the housing space through an opening, it is possible to efficiently cool the battery.

Furthermore, in the present invention, it is preferable that the opening is provided in a front wall portion of the cover member.

According to the present configuration, at the time of forward travel, which is performed more frequently than reverse travel, it is possible to suppress use of the cooling fan and save energy, and to efficiently cool the battery by taking the travel wind from the front into the housing space directly through an opening.

Furthermore, in the present invention, it is preferable that the work vehicle includes:

a vehicle speed sensor configured to detect a vehicle speed; and a control device configured to control driving of the cooling fan, wherein the control device drives the cooling fan based on a detection value of the vehicle speed sensor.

According to the present configuration, the cooling fan can be driven more precisely according to the vehicle speed. For example, if the vehicle speed is high, the traveling wind increases, and therefore it is sufficient to drive the cooling fan at a low rotation rate. Also, if the vehicle speed is low, the traveling wind decreases, and therefore it is sufficient to drive the cooling fan at a high rotation rate.

Furthermore, in the present invention, it is preferable that the control device includes a traveling state determination unit configured to determine whether a vehicle is in a traveling state or a stopped state based on the detection value of the vehicle speed sensor, and a cooling fan driving unit configured to drive the cooling fan based on the determination result of the traveling state determination unit, and the cooling fan driving unit drives the cooling fan if the vehicle is in the stopped state.

According to the present configuration, by driving the cooling fan in a state in which the car is stopped and no traveling wind is generated, the battery can be cooled efficiently.

Furthermore, in the present invention, it is preferable that the cooling fan driving unit does not drive the cooling fan if the vehicle is in the traveling state.

According to the present configuration, if the vehicle is in the traveling state, cooling of the battery is achieved using the traveling wind without driving the cooling fan, and thereby use of the cooling fan is suppressed to save energy, and the battery can be cooled efficiently.

Furthermore, in the present invention, it is preferable that if the vehicle is in the traveling state, the cooling fan driving unit drives the cooling fan when the detection value of the vehicle speed sensor is not more than a reference value.

According to the present configuration, even if the traveling wind decreases due to a drop in the vehicle speed, the battery can be cooled efficiently by driving the cooling fan.

Furthermore, in the present invention, it is preferable that in a region in which the detection value of the vehicle speed sensor is not more than the reference value, the cooling fan driving unit drives the cooling fan at a higher rotation rate the lower the detection value of the vehicle speed sensor is.

According to the present configuration, because the cooling wind of the cooling fan increases the more the vehicle speed drops, the efficiency of cooling the battery can be further improved.

BRIEF DESCRIPTION OF THE DRAWINGS

FIG. 13 is a drawing illustrating detaching and attaching a laterally-oriented frame in the seat support frame.

FIG. 14 is a cross-sectional view showing a coupling structure for a laterally-oriented frame in the seat support frame.

DETAILED DESCRIPTION

First Embodiment

Hereinafter, an example of an embodiment for a work vehicle according to the present invention will be described with reference to the drawings.

Note that the front-rear direction and the left-right direction in the description of the present embodiment are written as follows, as long as there is no particular description otherwise. That is, the direction of advancing to the forward side (see arrow F in FIG. 2) at the time of work travel of a traveling vehicle body, such as a multi-purpose work vehicle to which the present invention has been applied, is "front", the direction of advancing to the rearward side (see arrow B in FIG. 2) is "rear", and using a front-facing orientation in the front-rear direction as a reference, the direction corresponding to the right side (see arrow R in FIG. 2) is "right", and similarly, the direction corresponding to the left side (see arrow L in FIG. 2) is "left".

Overall Configuration

Figure 1:
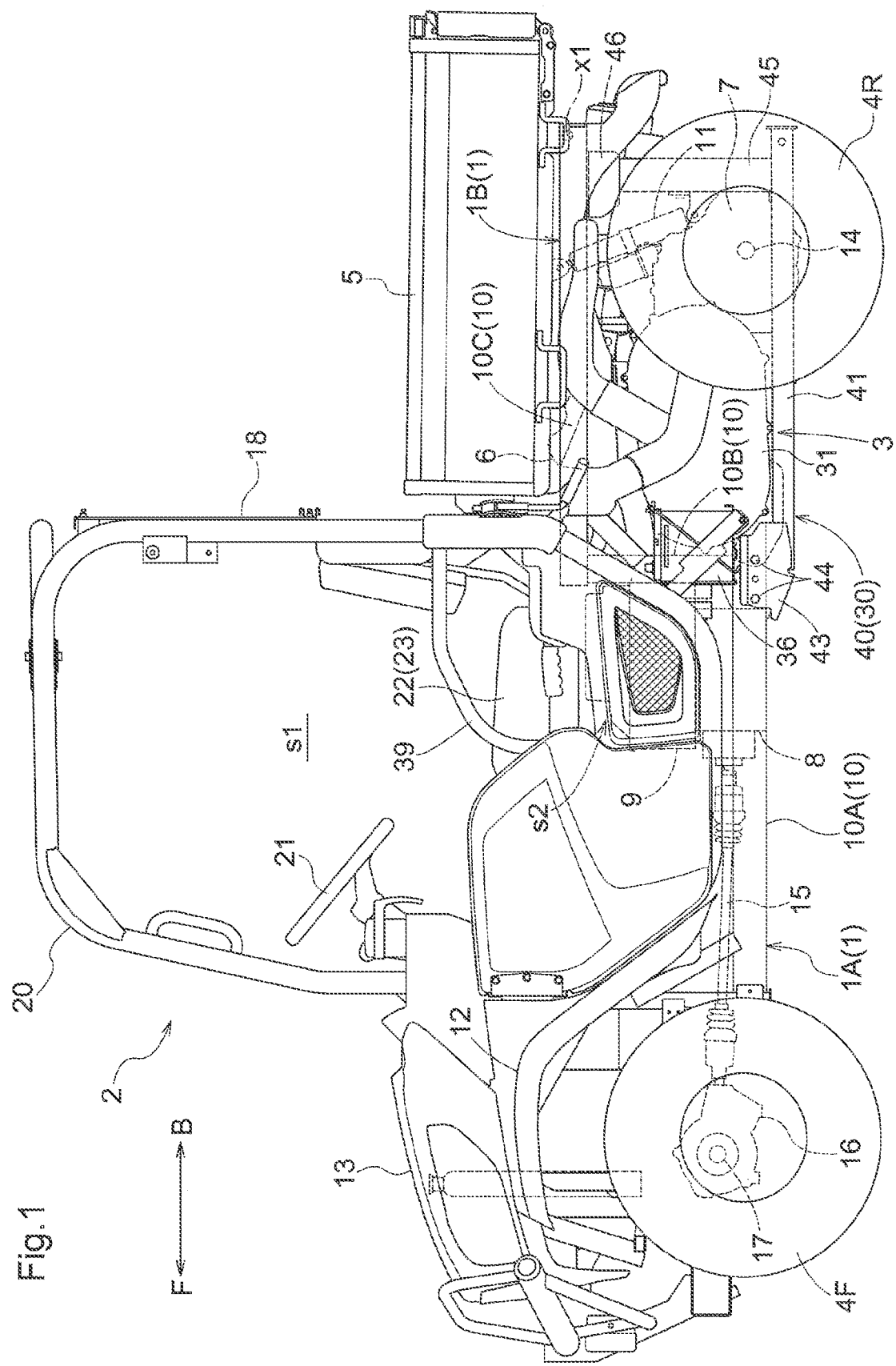
FIG. 1 is a left-side view of a multi-purpose work vehicle.
Figure 2:
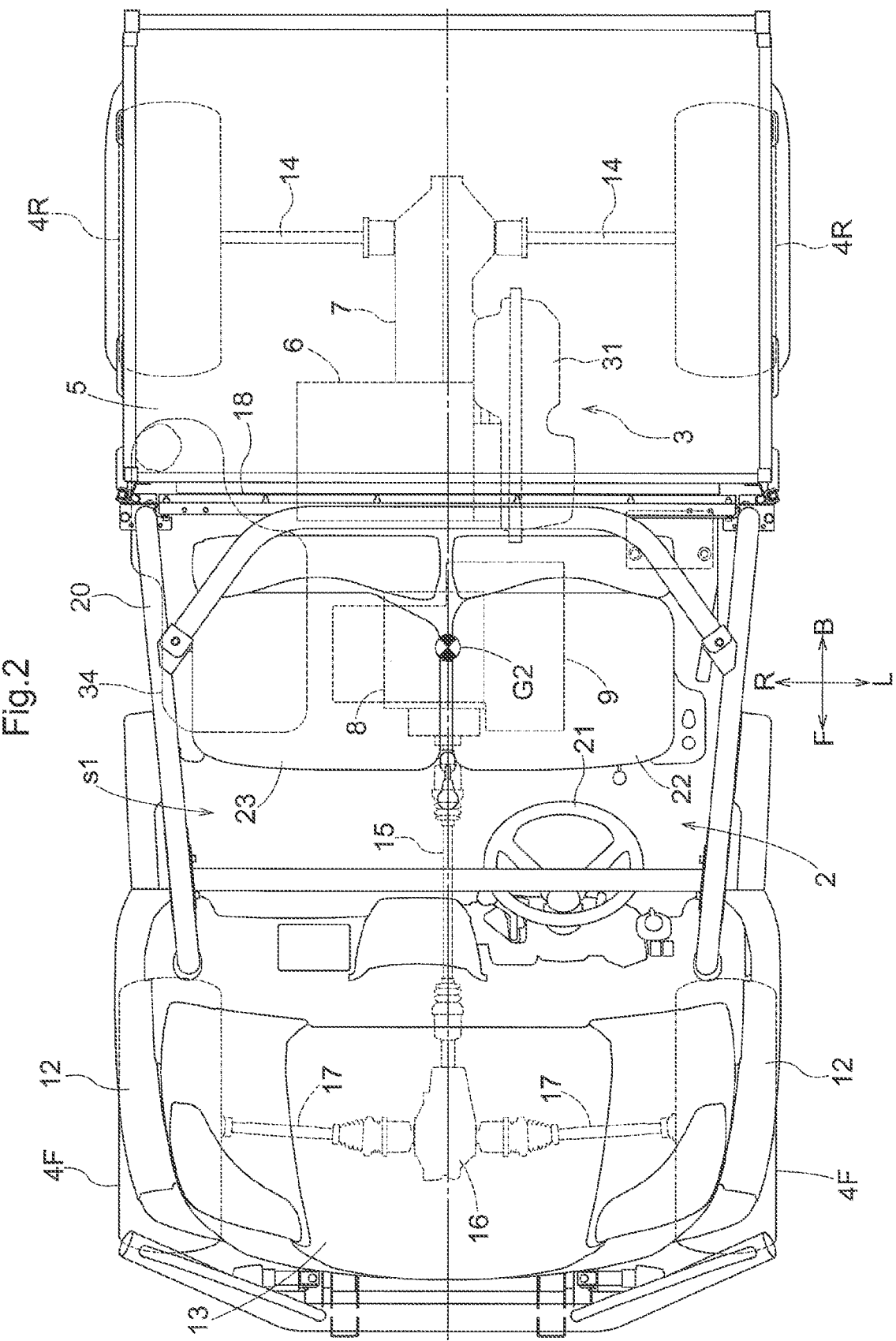
FIG. 2 is a plan view of the multi-purpose work vehicle.
Figure 3:
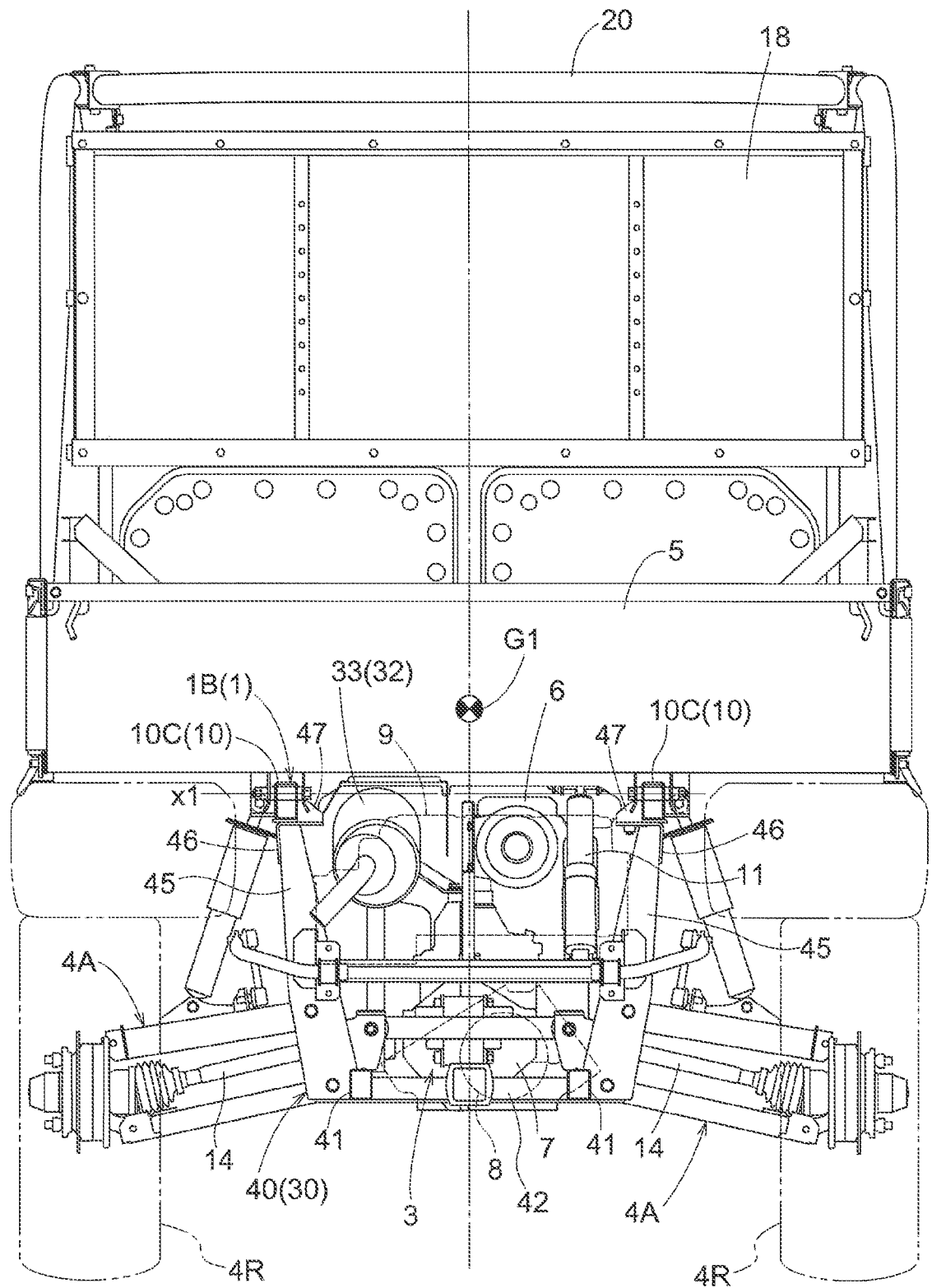
FIG. 3 is a rear view of the multi-purpose work vehicle.

FIGS. 1 to 3 show a multi-purpose work vehicle serving as an example of a work vehicle.

In the multi-purpose work vehicle, a left and right pair of front wheels 4F, 4F that can be steered are supported on the front portion of a vehicle body frame 1, which forms a framework for a traveling vehicle body. A left and right pair of rear wheels 4R, 4R that cannot be steered are supported on the rear portion of the vehicle body frame 1. Drive power can be transmitted from later-described traveling output apparatuses to the front wheels 4F, 4F and the rear wheels 4R, 4R. Accordingly, the multi-purpose work vehicle is constituted by a four-wheel-travel four-wheel-drive vehicle.

A driving portion 2 including a steering wheel 21 and a driver seat 22 is provided at an intermediate portion in the front-rear direction of the traveling vehicle body.

A cargo bed 5 that performs a dumping operation with the rear end side used as a swinging fulcrum x1 is equipped rearward of the driving portion 2, and a partitioning member 18 that partitions the driving portion 2 and the cargo bed 5 (constitutes a rear wall of the driving portion 2) is disposed between the driving portion 2 and the cargo bed 5.

The cargo bed 5 is configured to perform a dumping operation using an electric hydraulic cylinder 11 provided between the cargo bed 5 and a later-described motive power portion support frame 30 in the vehicle body frame 1. Also, left and right front fenders 12 and a hood 13 are included in the front portion of the multi-purpose work vehicle.

The motive power portion 3 is provided at the rear portion of the traveling vehicle body in a state of being located below the cargo bed 5.

Traveling output apparatuses of two systems, namely a gasoline engine 6 (hereinafter simply abbreviated as "engine"), which is an internal combustion engine, and an electric motor 8 are provided in the motive power portion 3.

In the traveling output apparatuses of the two systems, the power of the engine 6 is transmitted to the rear wheels 4R via rear axles 14 (corresponds to a power transmission axle) that extend in a left-right lateral orientation from a transmission case 7 in which a transmission (not shown) is included. The power of the electric motor 8 is input to a front wheel differential case 16 by the front wheel transmission shaft 15 extending forward from the front end portion of the electric motor 8, and the power is transmitted to the front wheels 4F via left and right front axles 17.

A ROPS frame 20 that surrounds the driver seat 22 in which a driver sits and a passenger seat 23 in which another passenger sits, and forms a riding space s1 is included in the driving portion 2. Accordingly, occupants sitting in the driver seat 22 and the passenger seat 23 are located in the riding space s1 surrounded by the ROPS frame 20.

Figure 4:
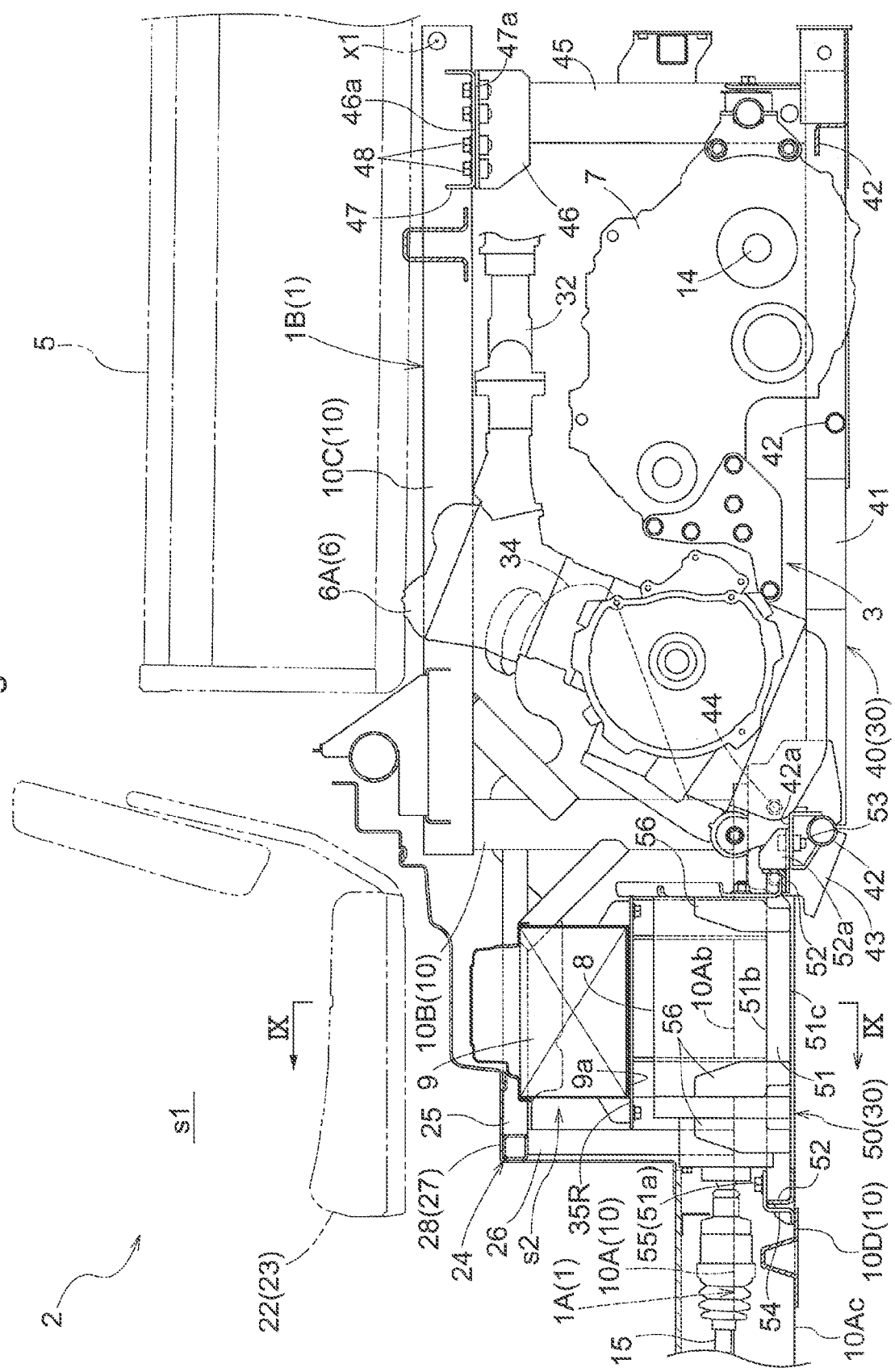
FIG. 4 is a left-side view showing a vehicle body frame and a motive power portion in a rear half portion of the multi-purpose work vehicle.
Figure 5:
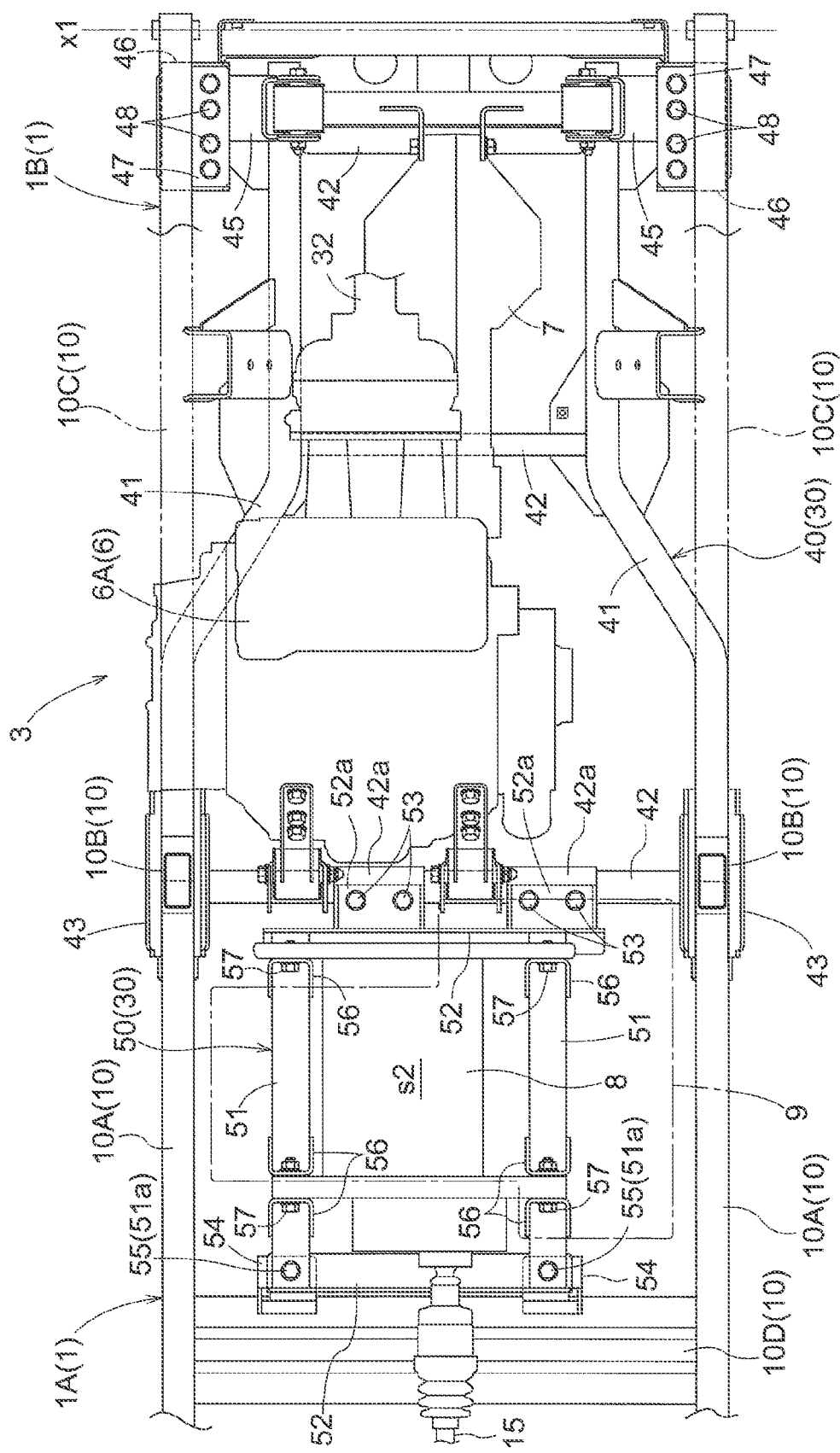
FIG. 5 is a plan view showing a vehicle body frame and a motive power portion in a rear half portion of the multi-purpose work vehicle.
Figure 6:
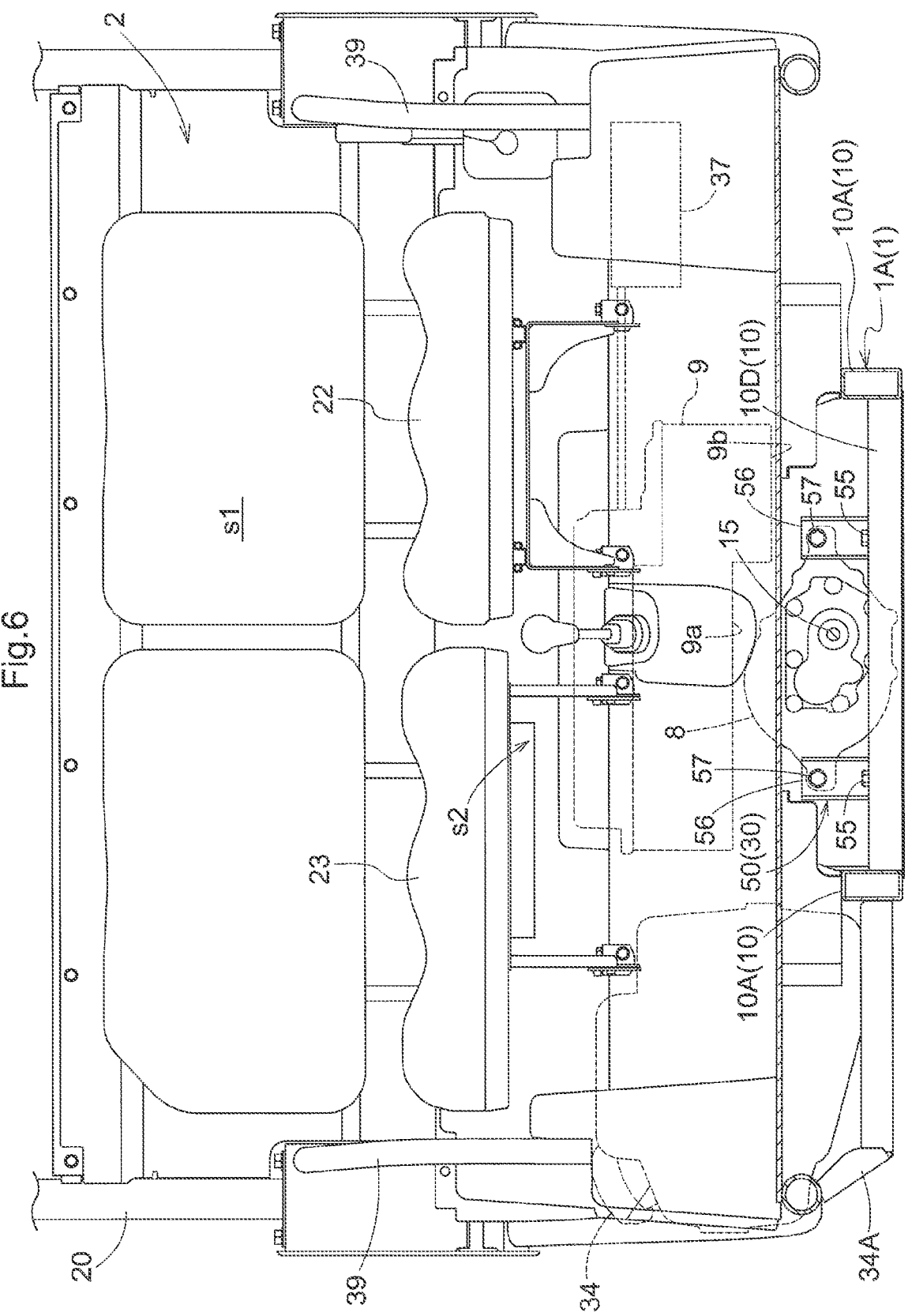
FIG. 6 is a front view showing a portion below a driver seat and an under-seat space, as viewed from the front surface side of the driver seat.

As shown in FIGS. 4 to 6, below the riding space s1 surrounded by the ROPS frame 20, a below-seat space s2 corresponding to the lower side of the driver seat 22 and the passenger seat 23 is used as a space for disposing a fuel tank 34 for supplying fuel to the engine 6, and a battery 9 for supplying power to the electric motor 8.

The under-seat space s2 is used also so that the electric motor 8 attached to the motive power portion support frame 30 supporting the engine 6 is equipped in a state of being in the under-seat space s2. The specific configuration relating to the disposition of the electric motor 8 attached to the motive power portion support frame 30 will be described later.

Vehicle Body Frame

Figure 8:
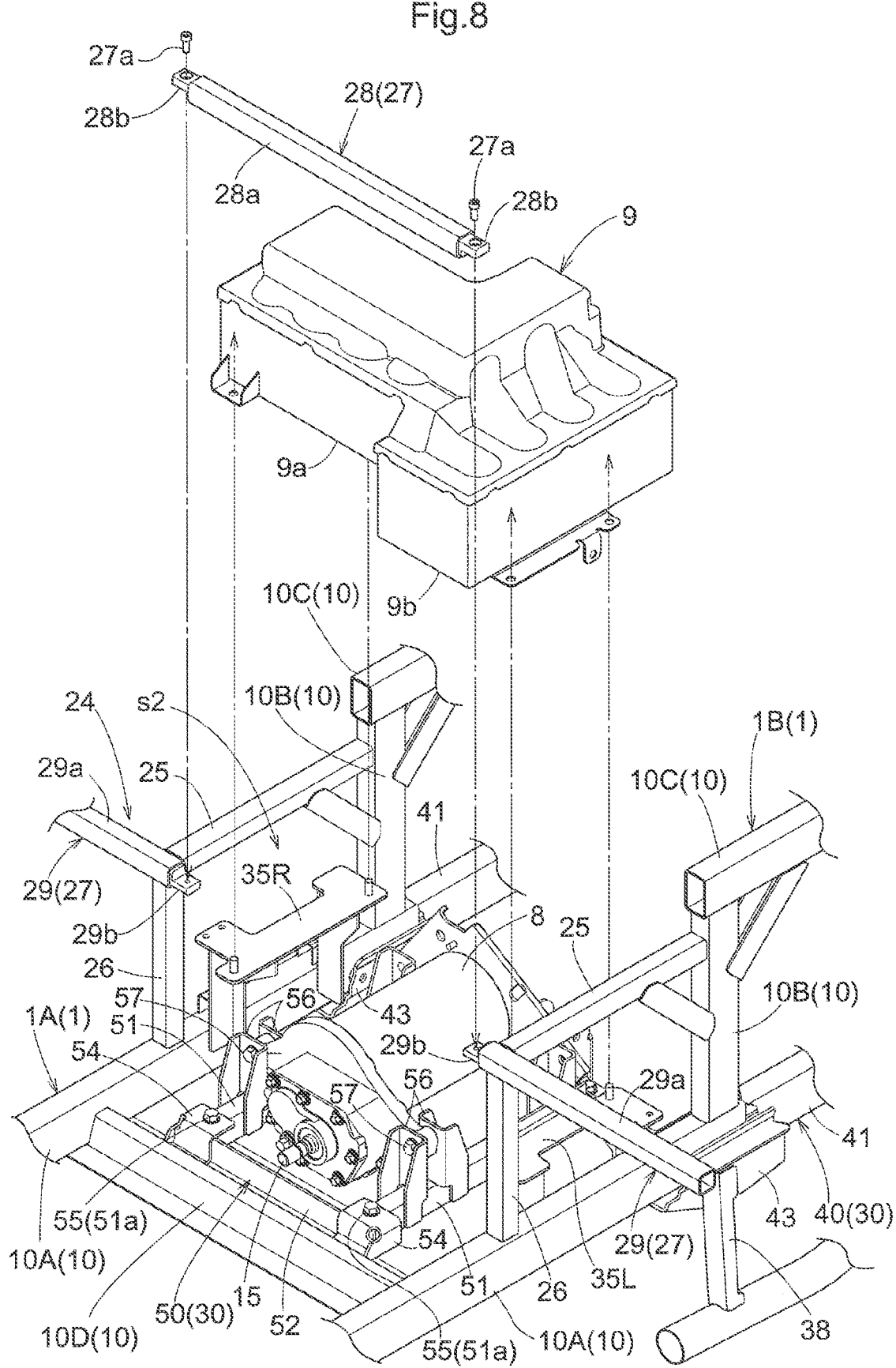
FIG. 8 is an exploded perspective view of a seat support frame and a below-seat space.

As shown in FIGS. 1, 4, and 8, a vehicle body frame 1 includes a front portion vehicle frame 1A disposed so as to support a floor surface of the driving portion 2, and a rear portion vehicle frame 1B disposed at a position higher than the floor surface of the driving portion 2. The rear portion vehicle frame 1B is located rearward of the front portion vehicle frame 1A, and the front portion vehicle frame 1A and the rear portion vehicle frame 1B are configured integrally with each other.

Specifically, the vehicle body frame 1 includes a left and right pair of main frames 10 that are elongated in the front-rear direction. The main frame 10 includes a front portion frame 10A, a rear portion frame 10C, and a standing leg portion 10B that is located between and connects the front portion frame 10A and the rear portion frame 10C, whereby the main frame 10 is formed into a step shape whose frontward side is lower and whose rearward side is higher. The left and right main frames 10 are integrated by being coupled by horizontal rail members 10D at multiple locations in the front-rear direction.

The main frame 10 is provided in a range spanning over the entirety of the front portion vehicle frame 1A and the rear portion vehicle frame 1B in the front-rear direction. In the main frame 10, the front portion frame 10A is a framework for the front portion vehicle frame 1A, and the rear portion frame 10C is the framework for the rear portion vehicle frame 1B. At an intermediate position between the front portion vehicle frame 1A and the rear portion vehicle frame 1B, the standing leg portion 10B joins the front portion frame 10A and the rear portion frame 10C so as to integrate them.

As shown in FIGS. 1 and 2, the front portion vehicle frame 1A supports the left and right front wheels 4F via left and right front suspensions (not shown). The motive power portion support frame 30 is fixed to the lower side of the rear portion vehicle frame 1B, and the left and right rear wheels 4R are supported on the motive power portion support frame 30 via left and right rear suspensions 4A.

The motive power portion support frame 30 is for fulfilling the role of forming the motive power portion 3 below the rear portion vehicle frame 1B in addition to supporting the rear wheels 4R as described above, and constitutes a portion of the vehicle body frame 1. In other words, the motive power portion support frame 30 is configured to be able to join to the main frame 10, spanning between the rear end portion of the front portion vehicle frame 1A and the rear end portion of the rear portion vehicle frame 1B, and constitutes a portion of the vehicle body frame 1 when joined to the main frame 10. However, the motive power portion support frame 30 is configured to be detachable from the main frame 10.

Motive Power Portion Support Frame

The motive power portion support frame 30 includes an engine-side frame portion 40 on which an engine 6 and a transmission case 7 are mounted, and a motor-side frame portion 50 on which the electric motor 8 is mounted, and is constituted as follows.

As shown in FIGS. 4, 5, and 10 to 12, the front end portion of the engine-side frame portion 40 is configured to be joinable to the rear end portion of the front portion frame 10A at the rear end portion of the front portion vehicle frame 1A. The rear end portion of the engine-side frame portion 40 is configured to be joinable to the rear portion frame 10C at the rear end portion of the rear portion vehicle frame 1B.

The rear end portion of the motor-side frame portion 50 is joined to the front end portion of the engine-side frame portion 40 and the front end portion of the motor-side frame portion 50 is detachably joined to the front portion vehicle frame 1A at a location that is forward of the location at which the rear end portion of the front portion vehicle frame 1A and the front end portion of the engine-side frame portion 40 are joined.

The thus-configured engine-side frame portion 40 and motor-side frame portion 50 are configured to be detachable from the main frame 10 when joined together integrally.

The engine-side frame portion 40 will be described next.

Figure 11:
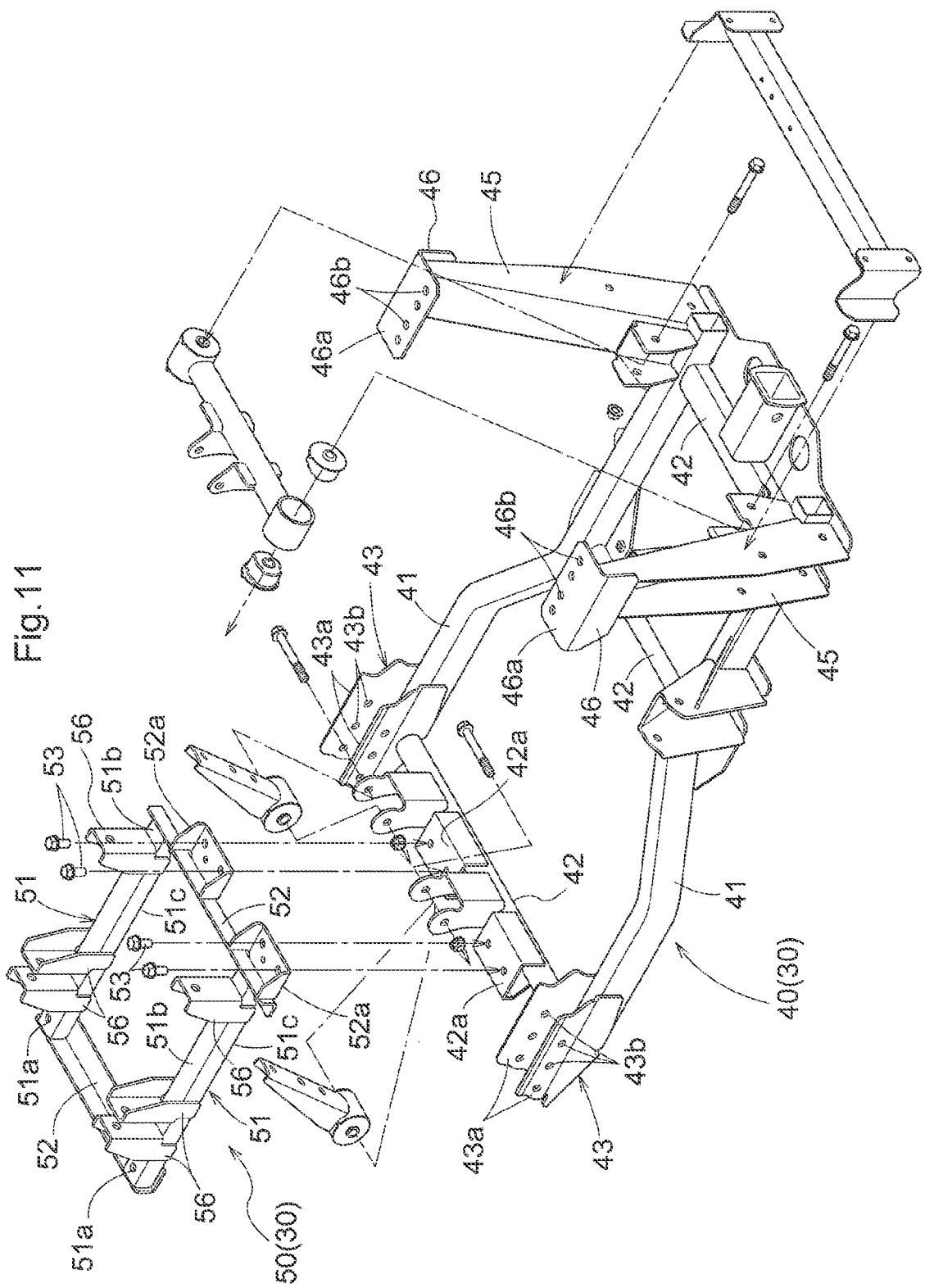
FIG. 11 is an exploded perspective view showing the motive power portion support frame.
Figure 12:
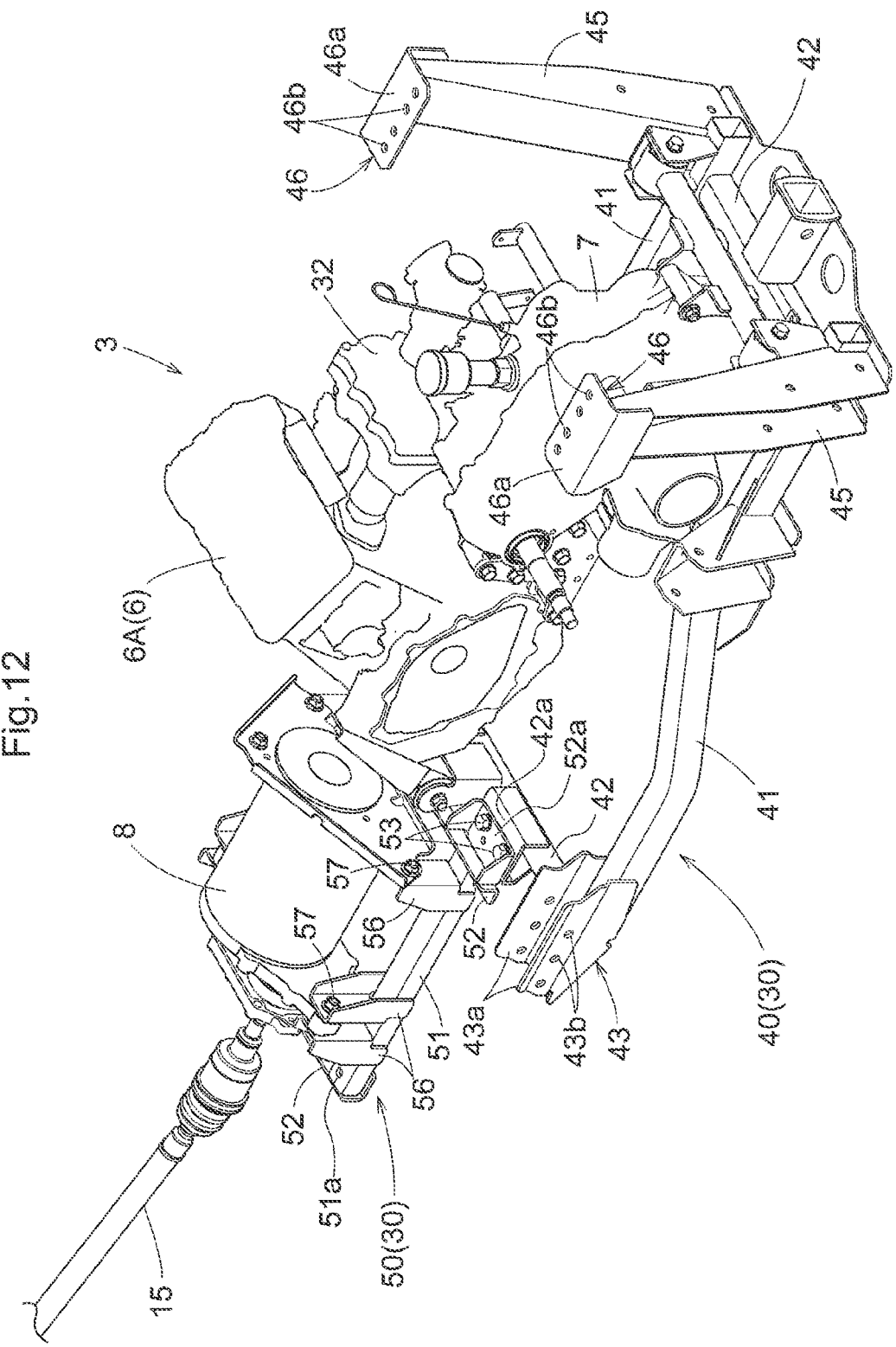
FIG. 12 is a perspective view showing a state in which an engine and an electric motor are incorporated in the motive power portion support frame.

As shown in FIGS. 5 and 11, the engine-side frame portion 40 includes a left and right pair of front-rear direction frames 41, which are integrally connected at their front end sides, rear end sides, and intermediate positions by horizontal members 42. The left and right front-rear direction frames 41 are constituted by rectangular pipe materials with rectangular cross sections. The rectangular pipe members are bent at intermediate positions in the front-rear direction, are formed such that the left-right direction interval on the rear side is narrower than the left-right direction interval on the front side, and thus are configured such that interference with the rear wheels 4R is avoided. The left-right direction interval on the front end side of the front-rear direction frame 41 is formed to be a left-right direction interval that is about the same as that at the rear end portion of the front portion frame 10A of the main frame 10.

A gutter-shaped bracket portion 43 for joining the front end portion of the engine-side frame portion 40 to the rear end portion of the front portion frame 10A is attached to the front end portion of the engine-side frame portion 40. Suspending members 45 for joining the rear end portion of the engine-side frame portion 40 to the rear end side of the rear portion frame 10C are attached at the rear end portion of the engine-side frame portion 40.

The upper end sides of the suspending members 45 are configured to be wider in the left-right direction such that the upper end sides can be joined to the left and right rear portion frames 10C, the lower end sides are configured to be narrower in the left-right direction due to the lower end sides being joined to the front-rear direction frames 41 of the engine-side frame portion 40, and thus the suspending members 45 are formed in a downwardly-tapering shape in a view in the front-rear direction.

Figure 15:
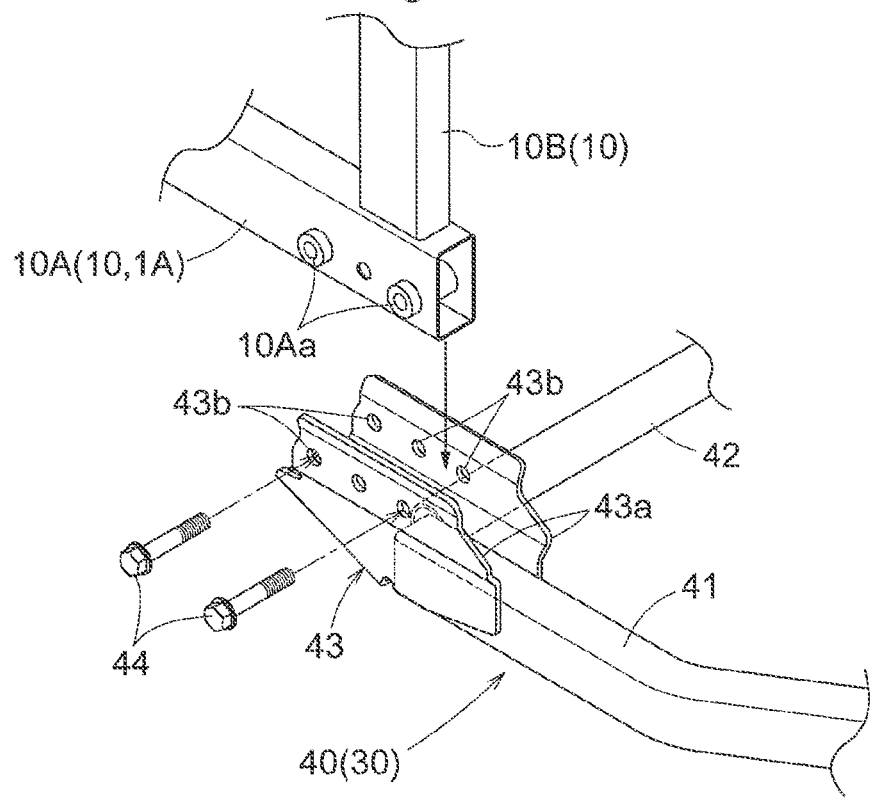
FIG. 15 is a perspective view showing a coupling structure at the main frame and a front portion of the motive power portion support frame.
Figure 16:
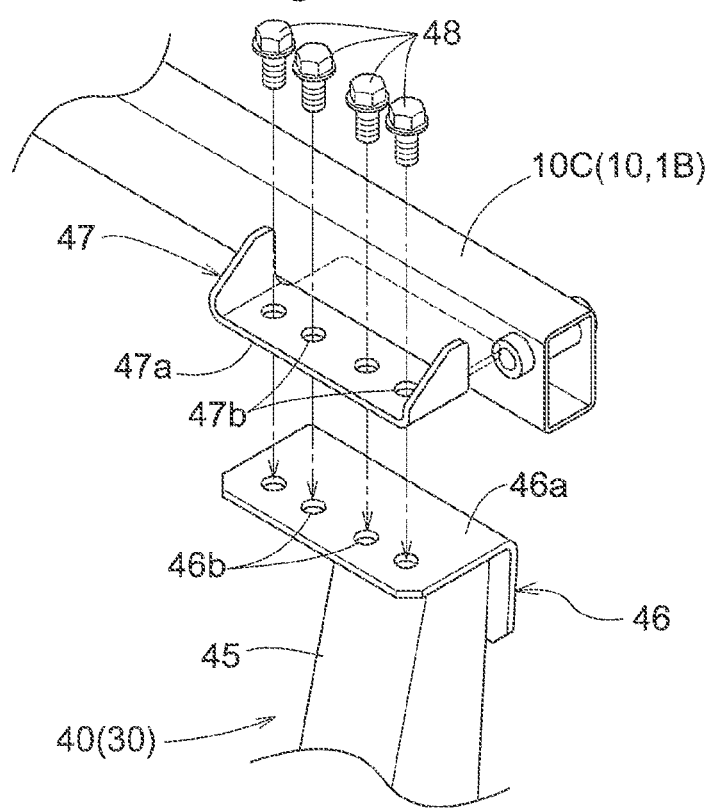
FIG. 16 is a perspective view showing a coupling structure at the main frame and a rear portion of the motive power portion support frame.

As shown in FIG. 15, the front end portion of the engine-side frame portion 40 is joined to the rear end portion of the front portion frame 10A via the gutter-shaped bracket portions 43 for joining, which are included on the front end portion of the engine-side frame portion 40.

The gutter-shaped bracket portions 43 are formed into gutter shapes whose upper sides are open, and are fixed by welding to the engine-side frame portion 40 in a state of embracing the front end portion of the engine-side frame portion 40 from below. Also, bolt insertion holes 43b are formed on lateral plate portions 43a of the gutter-shaped bracket portions 43, which protrude upward past the upper edges of the engine-side frame portion 40.

The gutter-shaped bracket portions 43 are attached from the lower side of the front portion frame 10A in a state in which the lateral plate portions 43a embrace the rear end portions of the front portion frames 10A from both the left and right sides. Bolt insertion holes 10Aa, which are formed on the rear end portions of the front portion frames 10A in this state, are lined up with the bolt insertion holes 43b formed on the lateral plate portions 43a, joining bolts 44 are inserted into the bolt insertion holes 10Aa and 43b from the left-right direction and are fastened, and the rear end portions of the front portion frames 10A are interposed between the lateral plate portions 43a from both the left and right sides, and are thus joined and fixed.

The rear end portion of the engine-side frame portion 40 is joined in the following manner to the rear end portion of the rear portion vehicle frame 1B.

As shown in FIGS. 10 to 12 and 16, the lower end portions of the suspending members 45, whose upper end portions can be joined to the rear portion frames 10C at the rear end portion of the rear portion vehicle frame 1B, are fixed by welding to the rear end portion of the engine-side frame portion 40.

Backing plates 46 for joining are fixed by welding to the upper end portions of the suspending members 45. The backing plates 46 for joining include upward-facing abutting surfaces 46a that include bolt insertion holes 46b. Attachment brackets 47 that include downward-facing lower surfaces 47a are fixed by welding to lateral side surface portions facing the vehicle body inward side, on the lateral side surfaces of the rear portion frames 10C. Bolt insertion holes 47b are formed in the attachment brackets 47 as well.

The bolt insertion holes 46b included in the backing plates 46 for joining and the bolt insertion holes 47b included in the attachment brackets 47 are lined up and are fastened by inserting joining bolts 48 in the vertical direction into the bolt insertion holes 46b and 47b. Thus, the upper end portions of the suspending members 45 are detachably fixed by joining to the rear portion frames 10C.

A motor-side frame portion 50 will be described next.

As shown in FIGS. 5, 8, and 11, the motor-side frame portion 50 includes a left and right pair of front-rear direction frames 51 constituted by downwardly-opening members that are channel-shaped in cross section. The motor-side frame portion 50 includes the front-rear direction frames 51 and a front and rear pair of horizontal members 52 that connect the front end sides and rear end sides of the front-rear direction frames 51, and thus the motor-side frame portion 50 is formed into a rectangular frame shape in plan view.

The width in the left-right direction of the front-rear direction frames 51 in the motor-side frame portion 50 is formed to be narrower than the interval in the left-right direction between the front portion frames 10A in the main frame 10, and the motor-side frame portion 50 is arranged in a state of being located between the left and right front portion frames 10A.

A left and right pair of joining brackets 52a that overlap with a left and right pair of attachment seat portions 42a included on the horizontal member 42 on the front end side of the engine-side frame portion 40 are provided on the horizontal member 52 on the rear end side of the motor-side frame portion 50. The joining brackets 52a and the attachment seat portions 42a are fastened due to joining bolts 53 being inserted therein, whereby the rear end side of the motor-side frame portion 50 is configured to be integrally joinable to the engine-side frame portion 40.

The front end side of the motor-side frame portion 50 is configured to be detachable from joining members 54 attached to the horizontal rail member 10D provided horizontally between the front portion frames 10A in the main frames 10. In other words, joining holes 51a are formed on the upper surface sides of the front end portions of the front-rear direction frames 51 of the motor-side frame portion 50, and lock nuts (not shown) are fixed on the under surface sides of the front-rear direction frames 51 at the regions at which the joining holes 51a are formed. Accordingly, the joining holes 51a of the front-rear direction frames 51 are positioned in a state of being in alignment with joining holes (not shown) formed in the joining members 54, whereby fixing by joining can be achieved by tightening the joining bolts 55, or joining can be removed by loosening the joining bolts 55.

The locations at which the joining members 54 and the front end portions of the front-rear direction frames 51 are joined are set to be locations that are located more forward in the front-rear direction of the vehicle body frame 1 than the locations at which the rear end portions of the front portion frames 10A and the front end portion of the engine-side frame portion 40 are joined.

Figure 9:
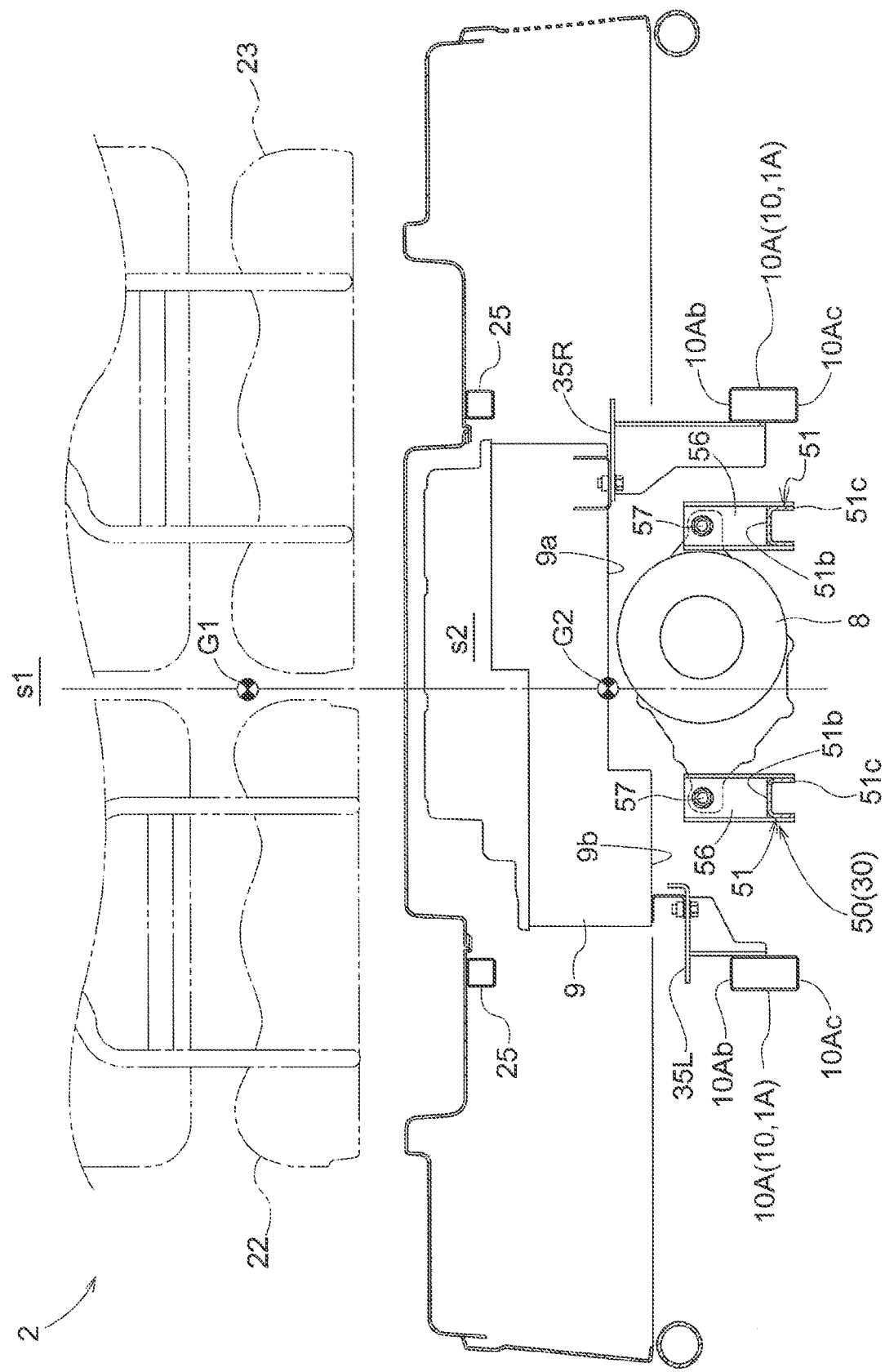
FIG. 9 is a cross-sectional view taken along line IX-IX in FIG. 4.

Also, the motor-side frame portion 50 is arranged not above the upper edges 10Ab of the front portion frames 10A, but as shown in FIG. 9, is arranged in a state in which the upper edges 51b of the front-rear direction frames 51 are located slightly lower than the upper edges 10Ab of the front portion frames 10A, and the lower edges 51c of the front-rear direction frames 51 and the lower edges 10Ac of the front portion frames 10A are at approximately the same height. Thus, due to the front-rear direction frames 51 being arranged at lower positions so as to be located within the vertical width of the front portion frames 10A, it is easier to arrange the electric motor 8 at a low position on the vehicle body frame 1.

Multiple fixing platforms 56 (corresponding to motor support portions) for joining and fixing the electric motor 8 are provided in a standing manner on the upper surface sides of the front-rear direction frames 51 of the motor-side frame portion 50, and the electric motor 8 is fixed to the front and rear fixing platforms 56 by inserting joining bolts 57 into attachment portions provided in the periphery of the electric motor 8.

When attached to the motor-side frame portion 50, the lower edge of the electric motor 8 is located lower than the upper edges 10Ab of the front portion frames 10A of the main frame 10, and is located above the lower edges of the front portion frames 10A (see FIG. 6).

Seat Support Frame

Next, a seat support frame 24 will be described.

Figure 7:
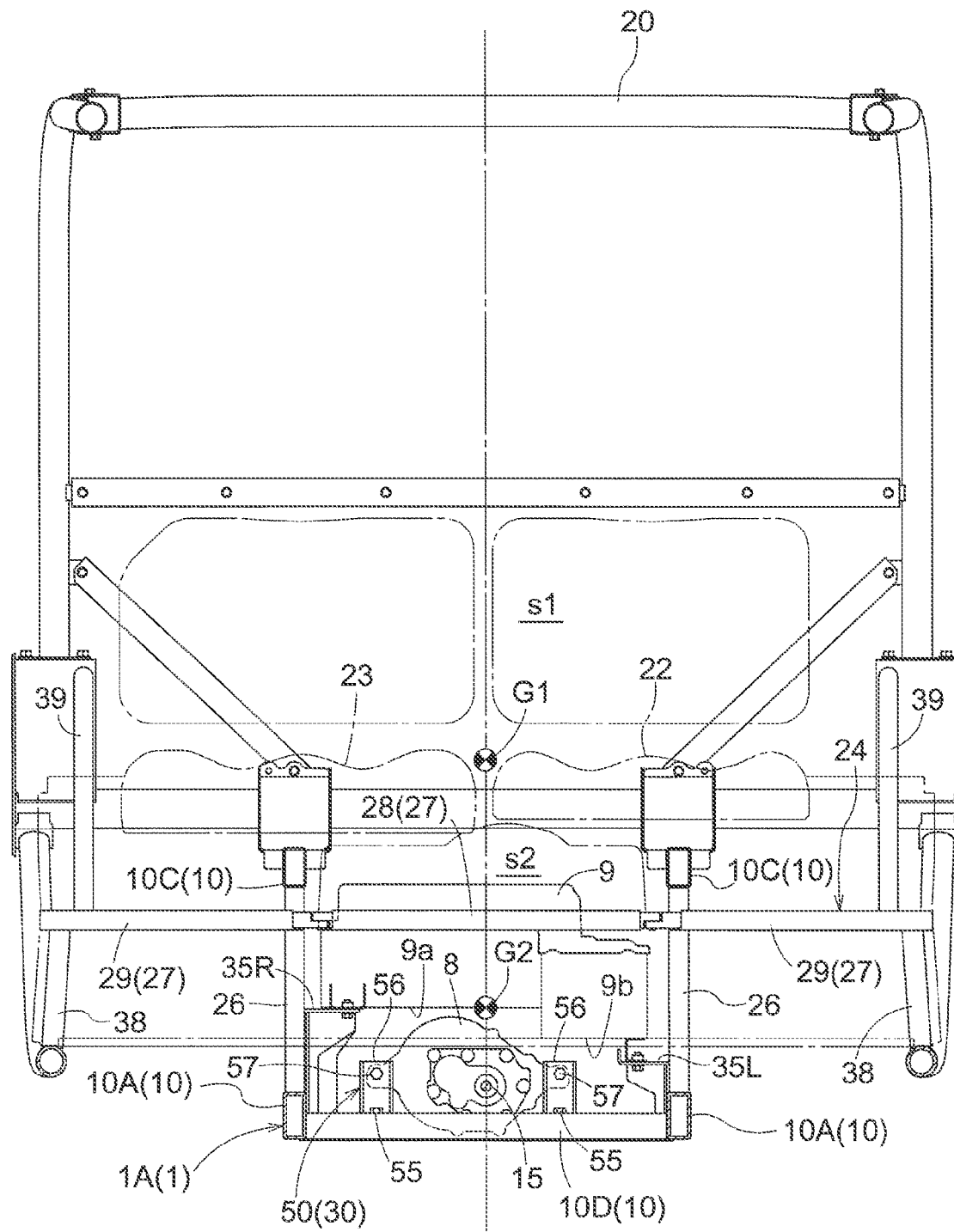
FIG. 7 is a front view showing a below-seat space, as viewed from the front surface side of the driver seat.

As shown in FIGS. 4 and 7, the seat support frame 24 is below the riding space s1 surrounded by the ROPS frame 20, is for supporting the driver seat 22 and the passenger seat 23, and is for forming the below-seat space s2 below the driver seat 22 and the passenger seat 23.

As shown in FIG. 6, the below-seat space s2 is used as a space for arranging the fuel tank 34 for supplying fuel to the engine 6, the battery 9 for supplying power to the electric motor 8, and various types of electrical devices 37 for control, and the below-seat space s2 is used also as a location for ensuring space for housing the electric motor 8.

As shown in FIG. 8, the seat support frame 24 includes a left and right pair of front-facing frames 25 that extend forward from the upper portions of the left and right standing leg portions 10B of the main frames 10, a left and right pair of upright frames 26 that are provided in a standing manner on the upper surface side of the left and right front portion frames 10A, and a laterally-oriented frame 27 that is arranged in the left-right direction in a state of connecting the intersection portions of the front-facing frames 25 and the upright frames 26.

A seat attachment platform (not shown) is mounted above the seat support frame 24, and the driver seat 22 and the passenger seat 23 are fixed to the seat attachment platform.

As shown in FIG. 6, in the below-seat space s2 formed below the seat support frame 24, a tank support platform 34A is extended toward the right side (shown on the left side in FIG. 6) of the right-side front portion frame 10A, and the fuel tank 34 is arranged above the tank support platform 34A.

On the left side (shown on the right side in FIG. 6) of the left-side front portion frame 10A, various types of electrical devices 37 for control are equipped via appropriate attachment members joined to the laterally-oriented frame 27 of the seat support frame 24, so as to be located laterally outside of the front portion frame 10A.

As the battery 9 for supplying power to the electric motor 8, a lithium ion battery is included between the left and right front portion frames 10A in the below-seat space s2.

As shown in FIGS. 7 to 9, the battery 9 is formed into a shape having a level difference in which the height on the lower surface side is different on the left and on the right. A higher lower surface 9a, which is on the right side, is fixed to a taller right attachment platform 35R, which is provided in a standing manner on the right-side front portion frame 10A, and a lower lower surface 9b, which is on the left side, is attached to a shorter left attachment platform 35L, which is provided in a standing manner on the left-side front portion frame 10A.

Among the lower surfaces 9*a* and 9*b* with different heights, the left-right direction length of the higher lower surface 9*a* on the right side is formed to be longer than the left-right direction length of the lower lower surface 9*b* on the left side, and the electric motor 8 mounted on the motor-side frame portion 50 of the motive power portion support frame 30 is disposed in the space below the higher lower surface 9*a* on the right side in a state of being in the space, or in other words, in a state of overlapping with the battery 9 in the front-rear direction and the left-right direction.

Thus, the battery 9 and the electric motor 8 overlap in the front-rear direction and in the left-right direction, and moreover, the upper portion of the electric motor 8 is disposed in a state of being below the higher lower surface 9*a* on the right side of the battery 9, whereby the battery 9, the electric motor 8, and an aggregate consisting of the battery 9 and the electric motor 8 are mounted in a state of being consolidated near a central position in the front-rear direction and the left-right direction of the traveling vehicle body.

In other words, the battery 9 and the electric motor 8 are located between the left and right front portion frames 10A in the left-right direction, and are located between the front axles 17 and the rear axles 14 in the front-rear direction. Furthermore, in the front-rear direction, the battery 9 and the electric motor 8 exist in the below-seat space s2, which is a location that is nearer to the central position.

Also, in the vertical direction as well, the battery 9 and the electric motor 8 are provided at a low position on the vehicle body frame 1.

In other words, the battery 9 is attached via the right attachment platform 35R and the left attachment platform 35L to the front portion frame 10A at a low position in the vehicle body frame 1. Also, the motor-side frame portion 50 includes the front-rear direction frames 51, which have upper edges 51*b* at positions lower than that of the upper edges 10A*b* of the front portion frames 10A, and the electric motor 8 is mounted on the front-rear direction frames 51. By thus arranging the motor-side frame portion 50 as low as possible on the traveling vehicle body, the height of disposing the electric motor 8 in the traveling vehicle body is made as low as possible.

In addition to this, by disposing the electric motor 8 in a state of being below the higher lower surface 9*a* of the battery 9, which has a level difference on its lower surface side, a state is entered in which the battery 9 and the electric motor 8 overlap in the vertical direction as well. Accordingly, the height position of the center of gravity G2 can be set to a position that is as low as possible in the traveling vehicle body for the aggregate consisting of the battery 9 and the electric motor 8.

As a result, as shown in FIG. 7, in a multi-purpose work vehicle, which includes a sturdy ROPS frame 20, and in which the position of the center of gravity G1 of the overall traveling vehicle body tends to be comparatively high, the height position of the center of gravity G2 of the aggregate consisting of the battery 9 and the electric motor 8 is lower than the height position of the center of gravity G1 of the overall traveling vehicle body. In other words, the above-described arrangement configuration of the battery 9 and the electric motor 8 serves as a means for making the height of the center of gravity G1 of the overall traveling vehicle body lower.

Note that the center of gravity G1 of the overall traveling vehicle body in this context refers to the position of the center of gravity G1 of the overall traveling vehicle body in a state in which the battery 9 and the electric motor 8 are mounted on the vehicle body frame 1.

In the seat support frame 24, the laterally-oriented frame 27, which extends in the left-right direction, can be divided at two locations between the left and right front portion frames 10A, the locations being separated slightly on the vehicle body inner side with respect to the intersection portions of the left and right front-facing frames 25 and the upright frames 26.

The purpose of this is to, in the case of employing a configuration in which a portion of the battery 9 is disposed in a state of being below the laterally-oriented frame 27, make it possible to detach a portion of the laterally-oriented frame 27 at a location opposing the position at which the battery 9 exists, thus making it easier to lift and lower the battery 9 without hindrance.

Specifically, as shown in FIGS. 7 and 8, the rectangular pipe-shaped laterally-oriented frame 27 is constituted by a combination of a detachable frame portion 28 (corresponds to a frame portion) that is detachable, and fixed frame portions 29 (correspond to another frame portion) that are not detachable.

The fixed frame portions 29 are fixed to the vehicle body frame 1 due to the vicinities of the end portions on the vehicle body inward side being joined to the intersection portions between the front-facing frames 25 and the upright frames 26, and due to the vicinities of the end portions on the vehicle body outward sides being joined to outside leg frames 38 and handrail frames 39, which are provided on the vehicle body outward side with respect to the front portion frames 10A.

The detachable frame portion 28 is merely configured such that both end portions thereof are joinable to the left and right fixed frame portions 29, and is not joined at other regions.

The detachable frame portion 28 and the fixed frame portions 29 are joined as follows.

As shown in FIGS. 13 and 14, the detachable frame portion 28 and the fixed frame portions 29 are constituted by fitting rectangular column-shaped connecting metal parts 28*b* and 29*b* on the end portions of rectangular pipe-shaped frame tubes 28*a* and 29*a* so that they are fixed integrally.

Among the connecting metal parts 28*b* and 29*b*, the connecting metal part 29*b* on the fixed frame portion 29 side has a shape obtained by cutting out an upper half portion on the end portion opposing the detachable frame portion 28. The connecting metal part 28*b* on the detachable frame portion 28 side has a shape obtained by cutting out a lower half portion on the end portion opposing the fixed frame portion 29 side.

Also, the connecting metal part 28*b* on the detachable frame portion 28 having the shape obtained by cutting out the lower half portion is overlapped with the upper side of the connecting metal part 29*b* on the fixed frame portion 29 having the shape obtained by cutting out the upper half portion, and the connecting metal parts 28*b* and 29*b* are joined using a vertical-direction joining bolt 27*a* that vertically penetrates through the connecting metal parts 28*b* and 29*b*, whereby the detachable frame portion 28 is joined to the fixed frame portion 29.

Motive Power Portion

The motive power portion 3 in which the traveling output apparatuses of two systems are disposed will be described next.

The region that exists below the seat support frame 24 and the region that exists above the motive power portion support frame 30 correspond to the motive power portion 3.

In the traveling output apparatuses of two systems, the traveling output apparatus of one system is the engine 6, which is constituted by an internal combustion engine, and the traveling output apparatus of another system is the electric motor 8 for travel driving.

In this multi-purpose work vehicle, a configuration is used in which the rear wheels 4R are driven by the power of the engine 6, and the front wheels 4F are driven by the driving power of the electric motor 8.

The state in which the driving of the rear wheels 4R by the engine 6 and the driving of the front wheels 4F by the electric motor 8 are performed at the same time is a four-wheel drive state, the driving state achieved with only the driving of the rear wheels 4R by the engine 6 is a rear two-wheel drive state, and the travel driving state achieved by only the driving of the front wheels 4F by the electric motor 8 is a front two-wheel drive state.

The four-wheel drive state, the rear two-wheel drive state, and the front two-wheel drive state are switched between as appropriate using an operation of switching an operation tool (not shown) in the driving portion 2, although a specific description of this will not be included.

As shown in FIGS. 2 to 4, in the motive power portion 3, in a region existing above the motive power portion support frame 30, the engine 6, which is in a laterally-placed orientation in which the output shaft (not shown) is aligned with the left-right direction of the vehicle body, is provided in a rearwardly-inclined orientation in which a cylinder head 6A side of the engine 6 is located further toward the rear of the vehicle body than the output shaft. By including the engine 6 in a rearwardly-inclined orientation in this manner, the overall height of the engine 6 can be made lower while the output shaft is maintained in a horizontal orientation, and the overall height of the motive power portion 3 can be made lower.

The transmission case 7 in which the transmission is included is disposed rearward of the engine 6. A belt-type continuously variable speed change apparatus 31 is disposed toward the left lateral side of the engine 6 and the transmission case 7, and an exhaust processing apparatus 33 such as a muffler is disposed at an intermediate position of an exhaust pipe 32, which extends rearward along the upper side of the belt-type continuously variable speed change apparatus 31.

As shown in FIGS. 6 to 8, in a region that exists below the seat support frame 24 in the motive power portion 3, the fuel tank 34 for supplying fuel to the engine 6 is provided at a right-side end portion of the below-seat space s2 as described above, and various electric devices 37 for control, which transmit control signals to the engine 6 and the electric motor 8, are provided at the left-side end portion of the below-seat space s2.

Figure 10:
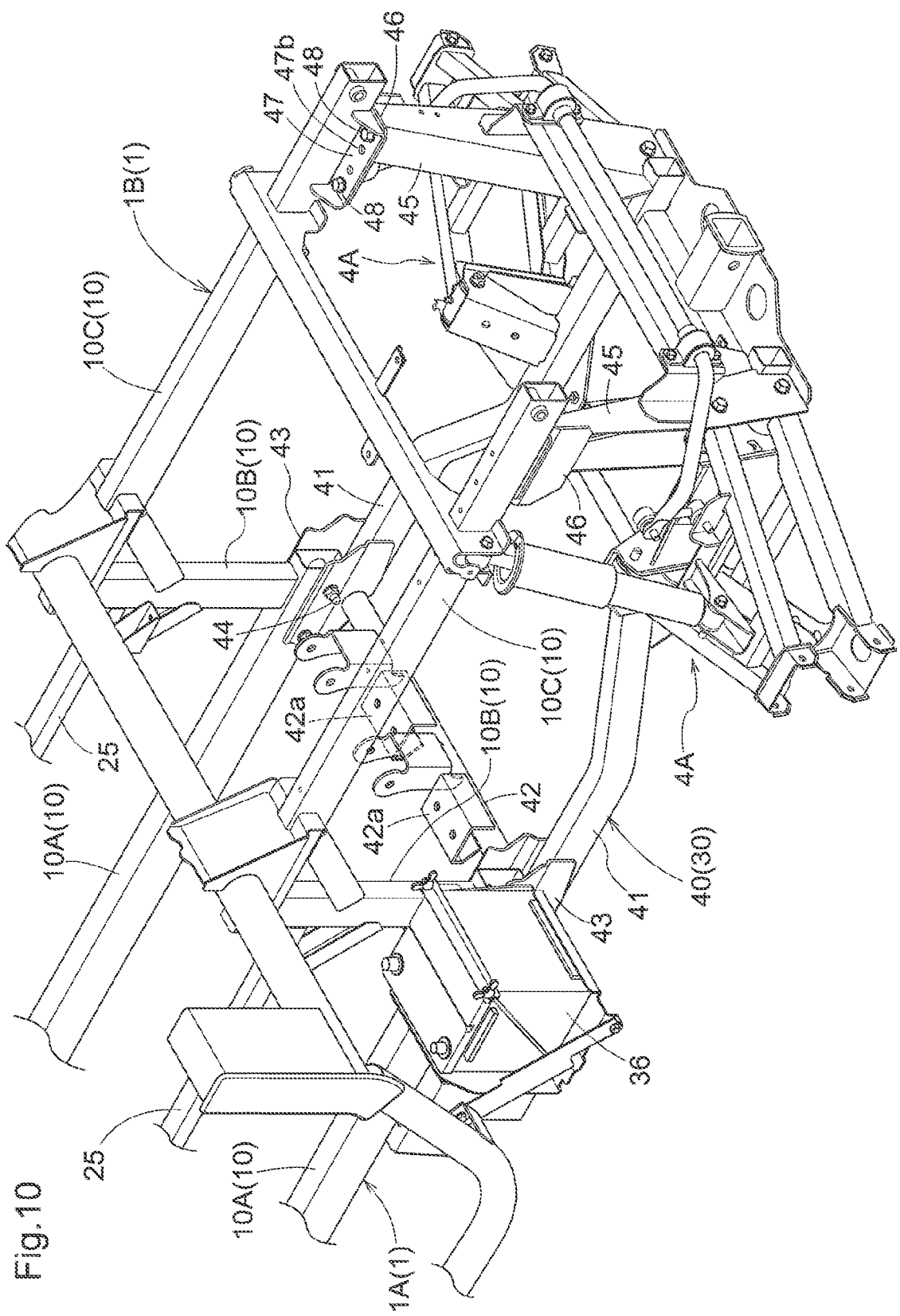
FIG. 10 is a perspective view showing a state of assembling a main frame and a motive power portion support frame.

Also, a control battery 36 for outputting control signals to the various electric devices 37 for control or for supplying power for controlling the operation of the engine 6 is disposed at the left-side end portion of the below-seat space s2 in a state in which only the front-side portion of the control battery 36 exists below the seat support frame 24, and the rearward-side portion of the control battery 36 extends rearward past the lower side of the seat support frame 24 (see FIG. 10).

In the region existing below the seat support frame 24, the electric motor 8 for driving the front wheels 4F and the battery 9 for supplying power to the electric motor 8 are disposed between the left and right main frames 10, which corresponds to the center in the left-right direction.

The battery 9 is a lithium ion battery, and is constituted by a plug-in type that takes in power from outside.

The battery 9 is disposed in a state of being slightly lifted up by the right attachment platform 35R and the left attachment platform 35L in the below-seat space s2, the electric motor 8 being located below the battery 9. The battery 9 is disposed in a state of being located in front of the engine 6, being slightly lifted up by the right attachment platform 35R and the left attachment platform 35L, and being located within range of a height that is about the same as that of the engine 6.

The output shaft (not shown) of the electric motor 8 protrudes toward the vehicle body frontward side. A front wheel drive shaft 15 is joined to the output shaft and the power of the electric motor 8 is transmitted to the front wheels 4F via a front wheel differential case 16 and the front axles 17.

Other Embodiment 1

In the above-described embodiment, it was described that a gasoline engine is included as the engine 6, but there is no limitation to this structure.

For example, it is possible to use a diesel specification that includes a diesel engine.

As for the other configurations, it is sufficient to employ configurations similar to those in the above-described embodiment.

Other Embodiment 2

In the above-described embodiment, an example was given in which a plug-in type of battery 9 is used, but there is no limitation to this structure.

For example, it is possible to enable charging of the battery 9 using a generator or a regeneration device driven by the engine 6.

As for the other configurations, it is sufficient to employ configurations similar to those in the above-described embodiment.

Other Embodiment 3

In the above-described embodiment, a structure in which the electric motor 8 is equipped in the below-seat space s2 was described as an example, but there is no limitation to this structure.

For example, it is possible to equip the electric motor 8 in the space above the engine-side frame portion 40 and omit the motor-side frame portion 50.

As for the other configurations, it is sufficient to employ configurations similar to those in the above-described embodiment.

Other Embodiment 4

In the above-described embodiment, a structure in which the electric motor 8 is placed below the battery 9 was described as an example, but there is no limitation to this structure.

For example, the electric motor 8 and the battery 9 may be placed side by side in the left-right direction.

As for the other configurations, it is sufficient to employ configurations similar to those in the above-described embodiment.

Other Embodiment 5

In the above-described embodiment, a structure in which the ROPS frame 20 is provided in the driving portion 2 was described as an example, but there is no limitation to this structure.

For example, it is possible to use a structure in which a driving cabin is included instead of the ROPS frame 20, or a structure in which the ROPS frame 20 surrounding the driving portion 2 and the driving cabin are not included.

As for the other configurations, it is sufficient to employ configurations similar to those in the above-described embodiment.

Other Embodiment 6

In the above-described embodiment, a structure in which the battery 9 is fixed to the front portion frame 10A and the electric motor 8 is supported by the motor-side frame portion 50 was described as an example, but there is no limitation to this structure.

For example, a configuration may be used in which the motor-side frame portion 50 is not used, the electric motor 8 is fixed to the front portion frame 10A along with the battery 9 and is equipped in the below-seat space s2, and the electric motor 8 can be detached from the engine 6 and the transmission case 7 mounted on the engine-side frame portion 40.

As for the other configurations, it is sufficient to employ configurations similar to those in the above-described embodiment.

Other Embodiment 7

The present invention can be applied to a four-wheel drive work vehicle, such as a haulage vehicle, a tractor, a riding mower, or a riding rice transplanter that includes traveling output apparatuses of two systems, namely an engine and an electric motor.

Second Embodiment

An embodiment of the present invention will be described next with reference to the drawings. Note that in the description below, the direction of the arrow F shown in FIGS. 17 and 18 is a "vehicle body front side", the direction of the arrow B is a "vehicle body rear side", the direction of the arrow L shown in FIG. 18 is a "vehicle body left side", and the direction of the arrow R is a "vehicle body right side".

Overall Configuration of Utility Vehicle

Figure 17:
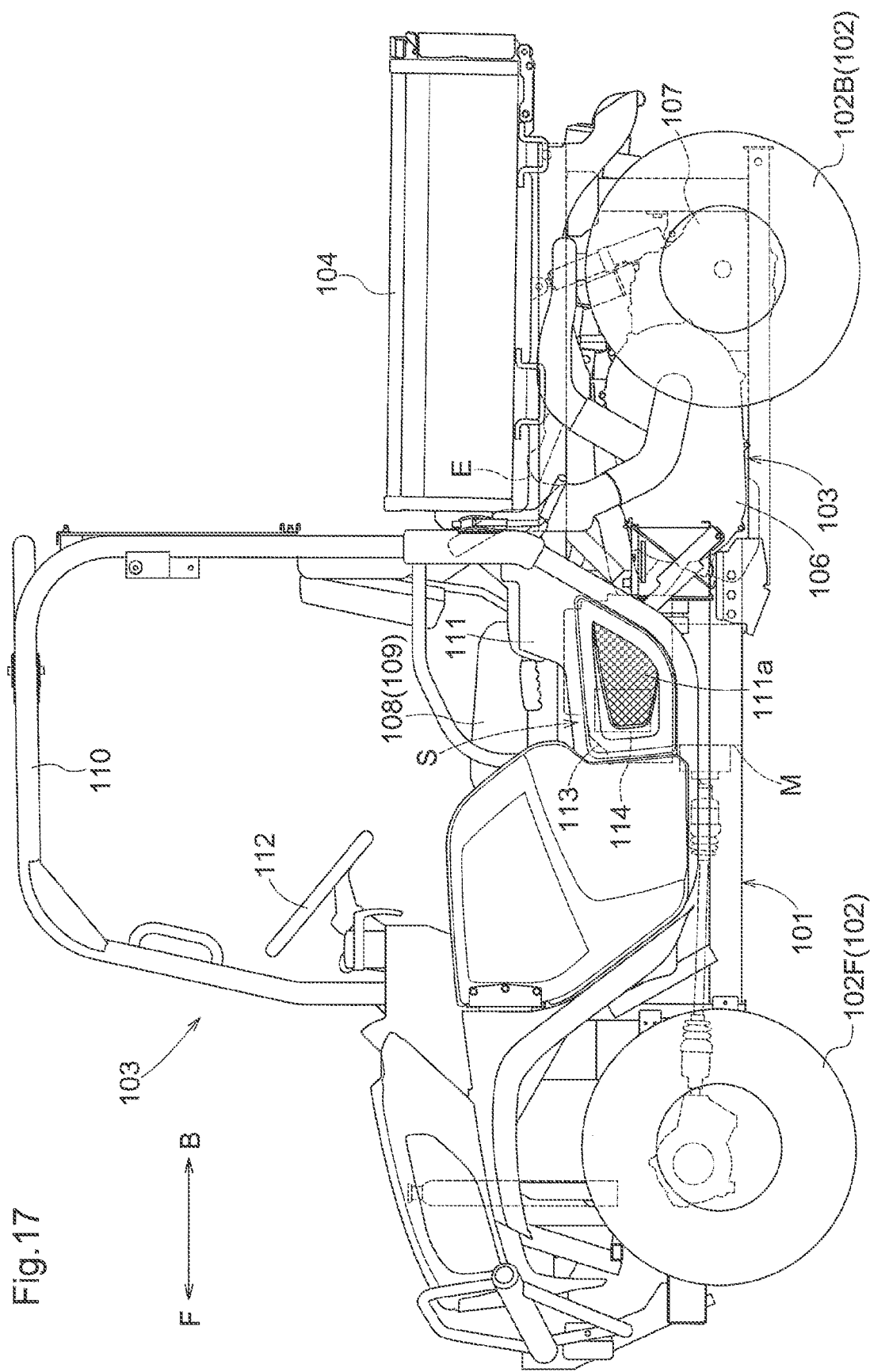
FIG. 17 is a left-side view showing a utility vehicle.
Figure 18:
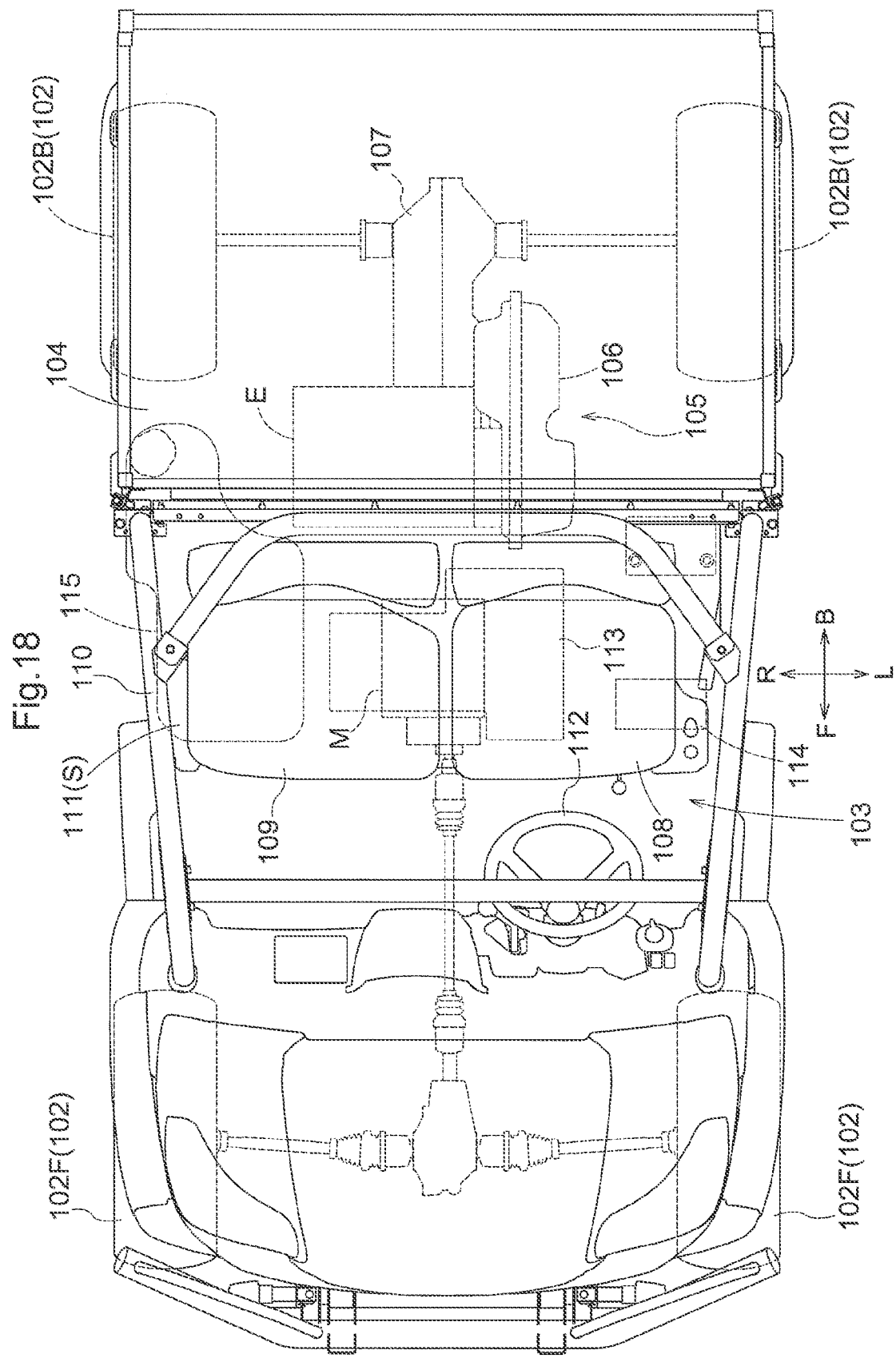
FIG. 18 is a plan view showing a utility vehicle.

FIGS. 17 and 18 show a utility vehicle (multi-purpose vehicle) that corresponds to a "work vehicle" according to the present invention. The present utility vehicle is a hybrid work vehicle that uses an engine E and an electric motor M as drive sources. The present utility vehicle includes a vehicle body frame 101, and wheel-type traveling apparatus 102 that supports the vehicle body frame 101. The traveling apparatus 102 includes a left and right pair of front wheels 102F that can be steered and can be driven, and a left and right pair of rear wheels 102B that can be driven. The traveling apparatus 102 can switch between a four-wheel drive state in which the drive power of the engine E is transmitted to the rear wheels 102B and the drive power of the electric motor M is transmitted to the front wheels 102F, a front-wheel drive state in which the drive power of the electric motor M is transmitted to the front wheels 102F and the drive power of the engine E is not transmitted to the rear wheels 102B, and a rear-wheel drive state in which the drive power of the engine E is transmitted to the rear wheels 102B and the drive power of the electric motor M is not transmitted to the front wheels 102F.

A driving portion 103 on which an occupant rides is provided at a central portion in the front-rear direction of the vehicle body frame 101. A cargo bed 104 is provided at the rear portion of the vehicle body frame 101. The cargo bed 104 can dump a load rearward by swinging up and down about a rearward fulcrum. A motive power portion 105 is provided below the cargo bed 104. The motive power portion 105 includes the engine E, a belt continuously variable speed change apparatus 106 that subjects the drive power of the engine E to continuous speed change, and a transmission 107 that subjects the power resulting from the speed change performed by the belt continuously variable speed change apparatus 106 to speed change and transmits it to the traveling apparatus 102 (rear wheels 102B). The transmission 107 includes a transmission mechanism (not shown) and a differential mechanism (not shown).

Driving Portion

As shown in FIGS. 17 to 20, the driving portion 103 includes a driver seat 108 in which a driver sits, a passenger seat 109 in which a passenger sits, and a ROPS 110 for protecting the occupants. The driver seat 108 and the passenger seat 109 are aligned in the vehicle body left-right direction in a state in which the driver seat 108 is located on the left side and the passenger seat 109 is located on the right side. The driver seat 108 and the passenger seat 109 are supported by being installed on a seat support cover 111 (corresponds to a "cover member" according to the present invention). A steering wheel 112 is provided forward of the driver seat 108. The electric motor M, which drives the traveling apparatus 102 (front wheels 102F), a battery 113 that supplies power to the electric motor M, an inverter 114 for the electric motor M, and a fuel tank 115 for the engine E are disposed below the driving portion 103.

Pedestal Cover

A housing space S is formed inside of the seat support cover 111. The battery 113 and the inverter 114 are arranged in the housing space S. A ventilation mesh portion 111a is provided in a left wall portion of the seat support cover 111. A ventilation opening 111b is formed in a portion of the front wall portion of the seat support cover 111, the portion opposing the battery 113. The opening 111b is formed into a laterally-oblong rectangular shape so as to span over a range that is about the same as the lateral width of the battery 113 (in this embodiment, a range slightly wider than the lateral width of the battery 113). A cooling fan 116 for supplying a cooling wind to the inside of the housing space S is attached at the opening 111b.

Arrangement of Battery and the Like

Figure 19:
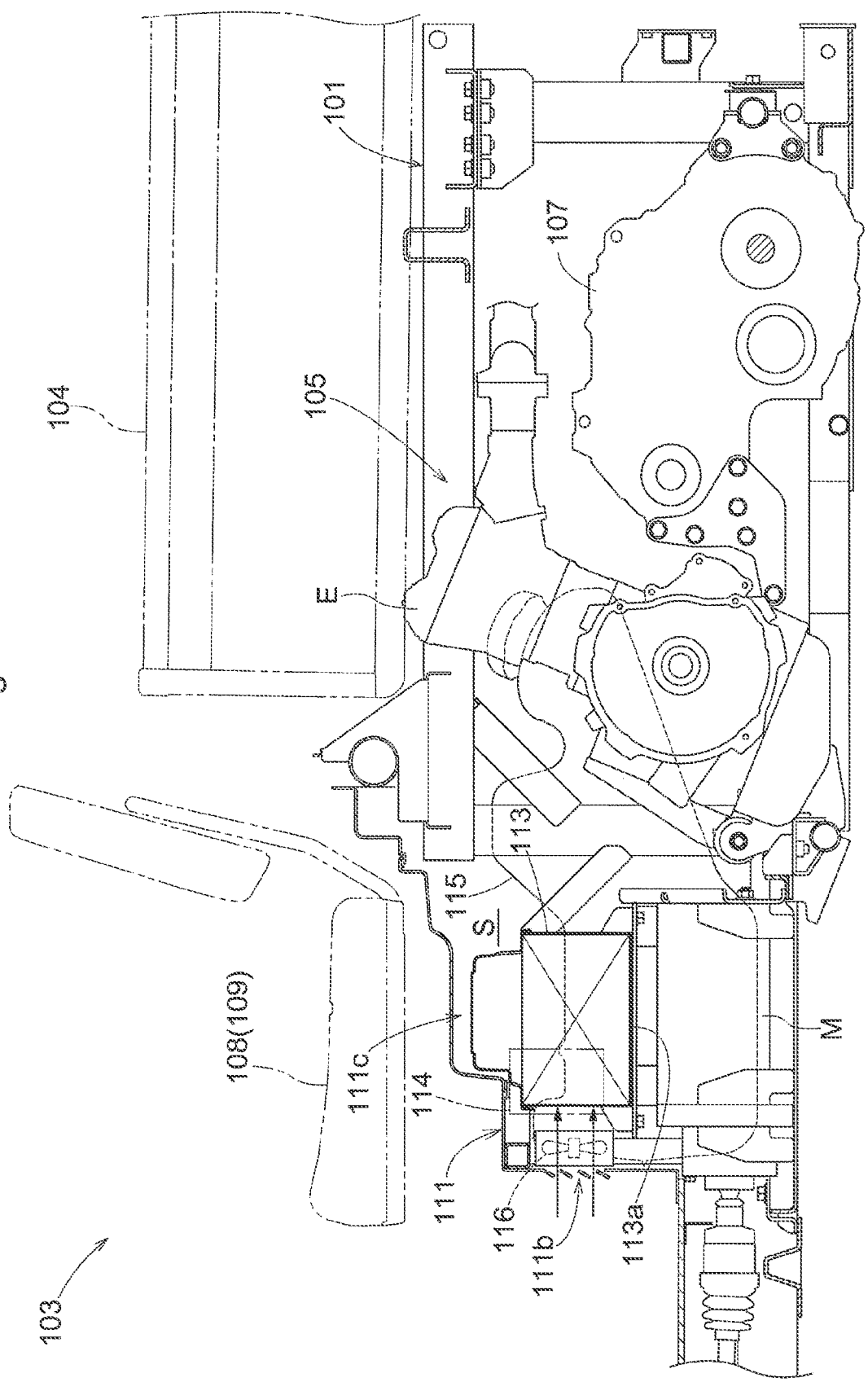
FIG. 19 is a left-side cross-sectional view showing a vehicle body rear half portion.
Figure 20:
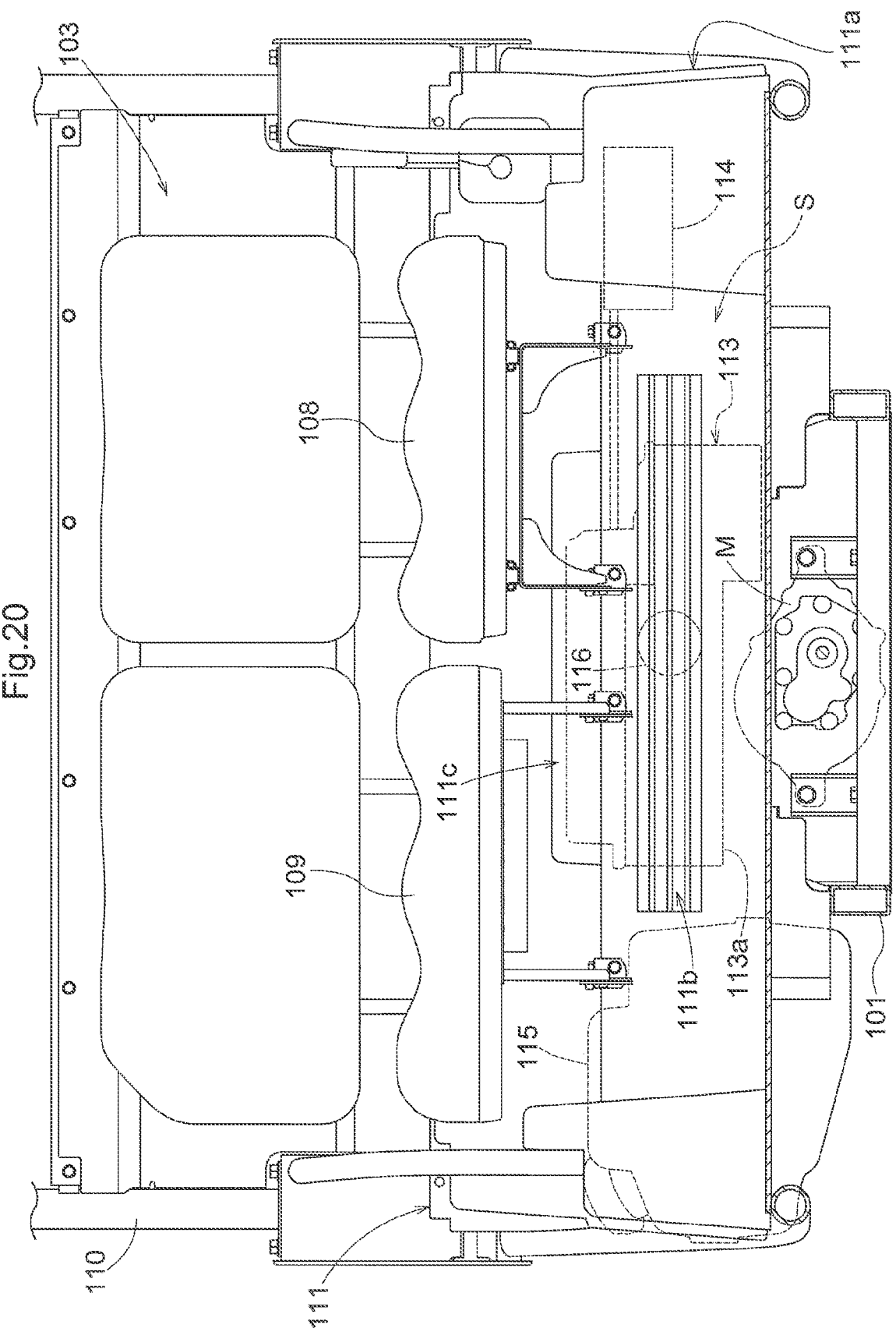
FIG. 20 is a front cross-sectional view showing a driving portion.

As shown in FIGS. 19 and 20, the battery 113 is arranged forward of the engine E, at a central portion in the left-right direction in the housing space S. A recessed portion 111c that is upwardly recessed is formed above the seat support cover 111. The battery 113 enters the recessed portion 111c. The front half portion of the fuel tank 115 enters a space to the right of the battery 113 in the housing space S.

The battery 113, the inverter 114, and the electric motor M are arranged in a concentrated manner so that a harness (not shown) that connects them is shorter. Specifically, the electric motor M is arranged below the battery 113, and the inverter 114 is arranged to the left of the battery 113. A recessed portion 113a that is upwardly recessed is formed on the lower surface portion of the battery 113. The electric motor M enters the recessed portion 113a.

According to this configuration, the battery 113 and the like are arranged by effectively using the housing space S inside of the seat support cover 111, and thereby space for arranging the battery 113 and the like can easily be ensured. Also, the battery 113 and the like can be efficiently cooled by taking the traveling wind and the cooling wind of the cooling fan 116 into the housing space S through the opening 111*b*.

Drive Control of the Cooling Fan

Figure 21:
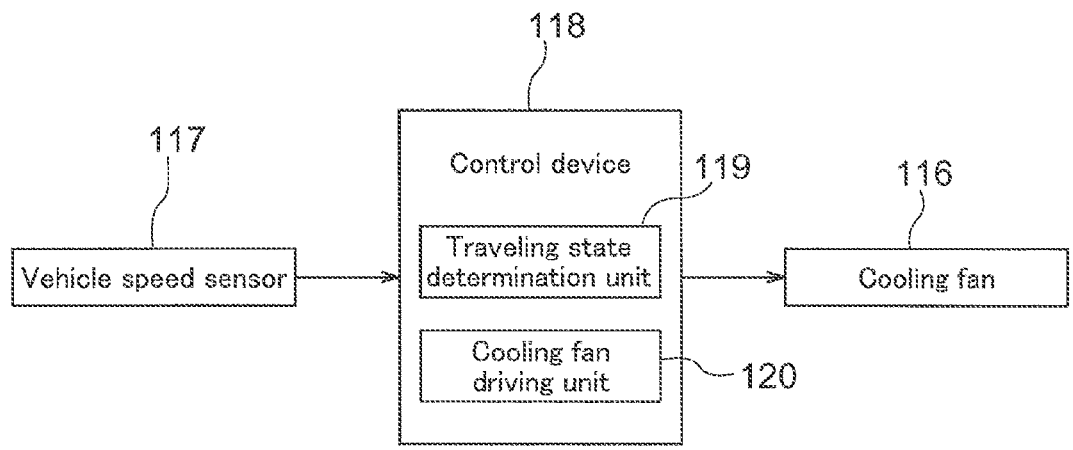
FIG. 21 is a diagram showing control blocks of a control device.

As shown in FIG. 21, the utility vehicle includes a vehicle speed sensor 117 that detects the vehicle speed, and a control device 118 for controlling the driving of the cooling fan 116. The control device 118 includes a traveling state determination unit 119 and a cooling fan driving unit 120. The traveling state determination unit 119 determines whether the vehicle is in a traveling state or a stopped state based on a detection value of the vehicle speed sensor 117. The cooling fan driving unit 120 drives the cooling fan 116 based on the determination result of the traveling state determination unit 119.

Figure 22:
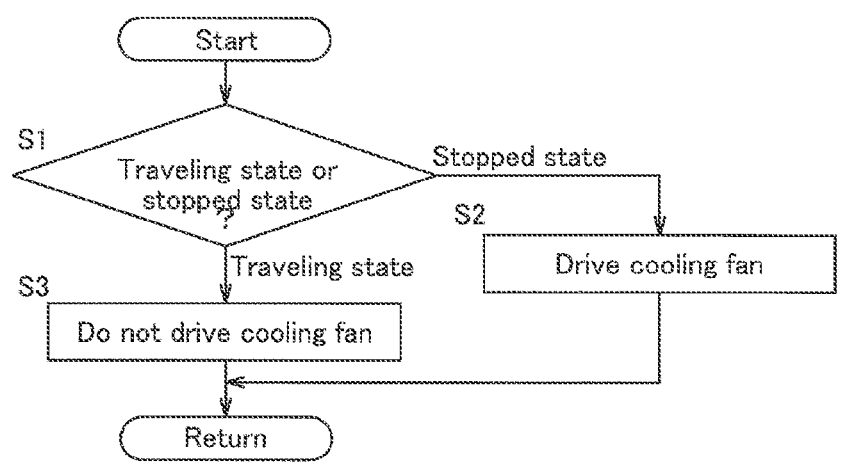
FIG. 22 is a diagram showing a control flow of a control device.

As shown in FIG. 22, the traveling state determination unit 119 determines whether the vehicle is in the traveling state or the stopped state based on the detection value of the vehicle speed sensor 117 (S1). Then, if the vehicle is in the stopped state (S1: stopped state), the cooling fan driving unit 120 drives the cooling fan 116 (S2). Also, if the vehicle is in the traveling state (S1: traveling state), the cooling fan driving unit 120 does not drive the cooling fan 116 (S3).

According to this kind of configuration, the battery 113 and the like can be efficiently cooled by driving the cooling fan 116 even in a state in which the vehicle is stopped and no traveling wind is generated. Also, if the vehicle is in the traveling state, cooling of the battery 113 and the like is achieved using the traveling wind without driving the cooling fan 116, and thus it is possible to efficiently cool the battery 113 and the like while usage of the cooling fan 116 is suppressed to save energy.

Other Embodiments (1) In the above-described embodiment, the cooling fan 116 is attached in the opening 111*b*, which is provided in the front wall portion of the seat support cover 111, but the present invention is not limited thereto. Instead of, or in addition to this, an opening may be provided at a location (e.g., the left wall portion, right wall portion, or the like of the seat support cover 111) other than the front wall portion of the sear support cover 111, and the cooling fan 116 may be attached at the opening. For example, the cooling fan 116 may be attached to a mesh portion 111*a* provided in the left wall portion of the seat support cover 111.

(2) The shape of the opening 111*b* is not limited to being the shape according to the above-described embodiment. Also, the number of cooling fans 116 is not limited to being one, and multiple cooling fans 116 may be included.

Figure 23:
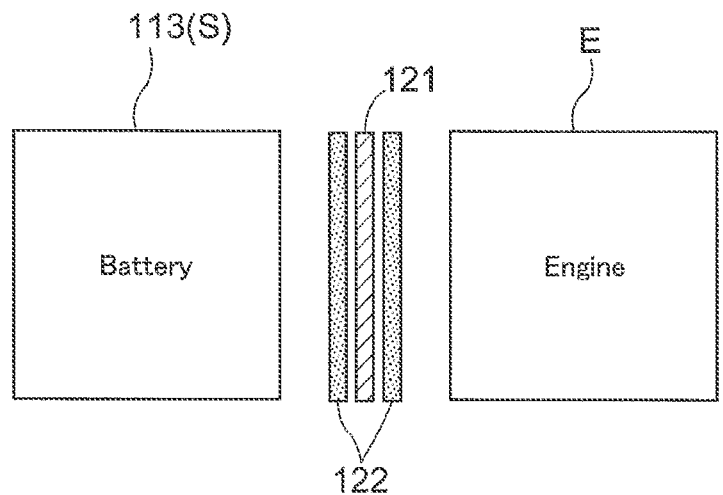
FIG. 23 is a schematic diagram showing a heat blocking structure of a battery.

(3) As shown in FIG. 23, a heat blocking plate 121 that separates the space in which the battery 113 is housed (housing space 5) and the space in which the engine E is housed may be provided between the battery 113 and the engine E. A thermally-insulating material 122 is adhered to both the surface on the battery 113 side and the surface on the engine E side of the heat blocking plate 121. Accordingly, the hot air of the engine E is blocked by the heat blocking plate 121, whereby the influence of heat on the battery 113 can be reduced.

Figure 24:
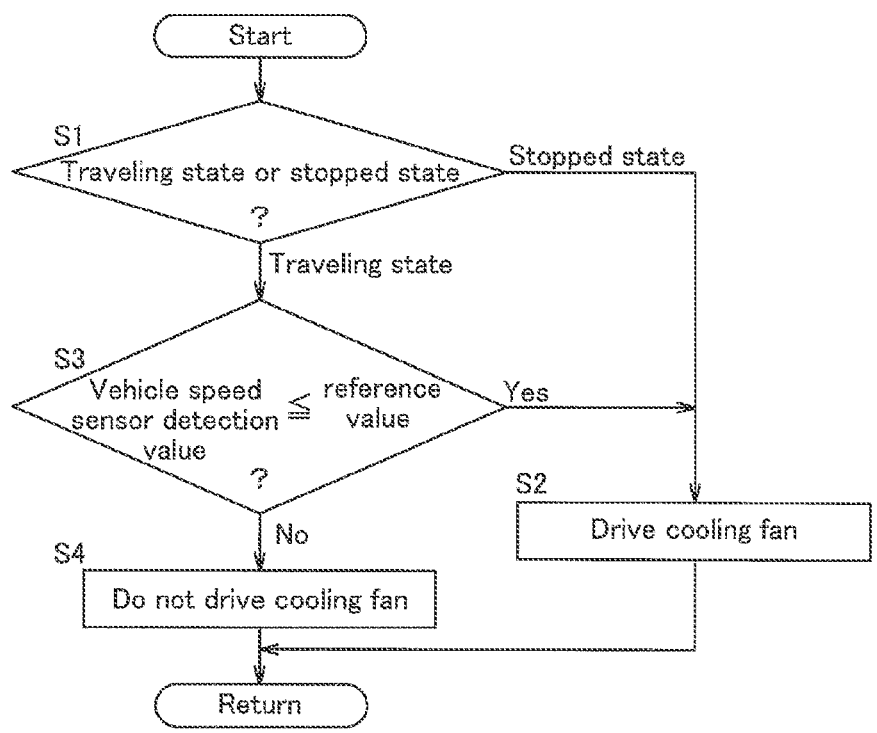
FIG. 24 is a diagram showing a control flow of a control device according to another embodiment.

(4) The control apparatus 118 may execute the control flow shown in FIG. 24. As shown in FIG. 24, the traveling state determination unit 119 determines whether the vehicle is in the traveling state or the stopped state based on the detection value of the vehicle speed sensor 117 (S1). Then, if the vehicle is in the stopped state (S1: stopped state), the cooling fan driving unit 120 drives the cooling fan 116 (S2). Also, if the vehicle is in the traveling state (S1: traveling state), the traveling state determination unit 119 determines whether or not the detection value of the vehicle speed sensor 117 is less than or equal to a reference value (S3).

Then, if the detection value of the vehicle speed sensor 117 is less than or equal to the reference value (S3: Yes), the cooling fan driving unit 120 drives the cooling fan 116 (S2). Accordingly, even if the traveling wind decreases due to a drop in the vehicle speed, the battery 113 and the like can be efficiently cooled by driving the cooling fan 116. Also, if the detection value of the vehicle speed sensor 117 exceeds the reference value (S3: No), the cooling fan driving unit 120 does not drive the cooling fan 116 (S4).

In the other embodiment (4), the cooling fan driving unit 120 may drive the cooling fan 116 at a constant rotation rate in a region in which the detection value of the vehicle speed sensor 117 is less than or equal to the reference value. Alternatively, in the region in which the detection value of the vehicle speed sensor 117 is less than or equal to the reference value, the cooling fan driving unit 120 may drive the cooling fan 116 at a higher rotation rate the lower the detection value of the vehicle speed sensor 117 is. Accordingly, since the cooling wind of the cooling fan 116 increases the more the vehicle speed decreases, the efficiency of cooling the battery 113 and the like can be further improved.

(5) In the above-described embodiment, the "work vehicle" according to the invention is a hybrid work vehicle that uses the engine E and the electric motor M as drive sources, but it is possible to use an electric work vehicle that uses only the electric motor M as the drive source.

(6) The present invention can be used in a tractor, a rice transplanter, or a combine instead of in a utility vehicle. Also, the present invention can be used in a construction work vehicle instead of in an agricultural work vehicle.

The invention claimed is:

1. A work vehicle, comprising:
   a traveling apparatus;
   an electric motor configured to drive the traveling apparatus;
   a battery configured to supply power to the electric motor;
   a cover member that supports a driver seat mounted thereon and includes a housing space in its interior;
   a cooling fan configured to supply a cooling wind into the housing space to cool the battery;
   a vehicle speed sensor configured to detect a vehicle speed; and
   a control device configured to control driving of the cooling fan,
   wherein the control device is configured to drive the cooling fan based on a detection value of the vehicle speed sensor,
   wherein the control device includes a traveling state determination unit configured to determine whether a vehicle is in a traveling state or a stopped state based on the detection value of the vehicle speed sensor, and a cooling fan driving unit configured to drive the cooling fan based on the determination result of the traveling state determination unit,
   wherein, when in the stopped state, the vehicle is not driving, and the cooling fan driving unit is configured to drive the cooling fan only if the vehicle is in the stopped state, and the cooling fan driving unit does not drive the cooling fan if the vehicle is in the traveling state, wherein the battery and the cooling fan are arranged in the housing space, wherein a ventilation opening is provided in a front wall portion of the cover member, wherein the cooling fan is attached at the ventilation opening at a position adjacent the housing space, wherein a recessed portion that is upwardly recessed is formed on a lower surface portion of the battery, and wherein the battery and the electric motor are aligned to each other in a vertical direction, with an upper portion of the electric motor entering the recessed portion.

2. The work vehicle according to claim 1, wherein the ventilation opening is provided in a front wall portion of the cover member.

3. A work vehicle, comprising:

a traveling apparatus;

an electric motor configured to drive the traveling apparatus;

a battery configured to supply power to the electric motor; and a cover member that supports a driver seat mounted thereon and includes a housing space in its interior;

a cooling fan configured to supply a cooling wind into the housing space to cool the battery;

wherein the battery and the cooling fan are arranged in the housing space, a ventilation opening is provided in a front wall portion of the cover member, and the cooling fan is attached at the ventilation opening at a position adjacent the housing space, wherein a recessed portion that is upwardly recessed is formed on a lower surface portion of the battery, and wherein the battery and the electric motor are aligned to each other in a vertical direction, with an upper portion of the electric motor entering the recessed portion.

4. The work vehicle according to claim 3, further comprising:

a vehicle speed sensor configured to detect a vehicle speed; and a control device configured to control driving of the cooling fan, wherein the control device drives the cooling fan based on a detection value of the vehicle speed sensor.

5. The work vehicle according to claim 4, wherein the control device includes a traveling state determination unit configured to determine whether a vehicle is in a traveling state or a stopped state based on the detection value of the vehicle speed sensor, and a cooling fan driving unit configured to drive the cooling fan based on the determination result of the traveling state determination unit, and wherein, when in the stopped state, the vehicle is not driving, and the cooling fan driving unit is configured to drive the cooling fan only if the vehicle is in the stopped state, and, the cooling fan driving unit does not drive the cooling fan if the vehicle is in the traveling state.

6. The work vehicle according to claim 4, wherein the control device includes a traveling state determination unit configured to determine whether the work vehicle is in a traveling state or a stopped state based on the detection value of the vehicle speed sensor, and a cooling fan driving unit configured to drive the cooling fan based on the determination result of the traveling state determination unit, and wherein if the vehicle is in the traveling state, the cooling fan driving unit drives the cooling fan when the detection value of the vehicle speed sensor is not more than a reference value.

7. The work vehicle according to claim 6, wherein in a region in which the detection value of the vehicle speed sensor is not more than the reference value, the cooling fan driving unit drives the cooling fan at a higher rotation rate the lower the detection value of the vehicle speed sensor is.

* * * * *